US006808633B1

(12) United States Patent
Okano et al.

(10) Patent No.: US 6,808,633 B1
(45) Date of Patent: Oct. 26, 2004

(54) CENTRIFUGAL SEPARATOR AND SAMPLE PREPARATION DEVICE USING THE SEPARATOR

(75) Inventors: Kazunori Okano, Shiki (JP); Katsuji Murakawa, Kodaira (JP); Shinichi Fukuzono, Hitachinaka (JP); Yukiko Ikeda, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/018,430

(22) PCT Filed: Jun. 23, 1999

(86) PCT No.: PCT/JP99/03341

§ 371 (c)(1),
(2), (4) Date: Dec. 20, 2001

(87) PCT Pub. No.: WO00/78464

PCT Pub. Date: Dec. 28, 2000

(51) Int. Cl.$^7$ .................................................. B01D 11/00

(52) U.S. Cl. .................... 210/634; 210/512.1; 210/702; 210/787; 494/17; 494/19; 494/37; 422/63; 422/72; 436/45; 436/177; 436/178

(58) Field of Search .................. 73/863.21; 422/63–65, 422/67, 70, 72, 101, 69; 436/45–49, 177, 178; 494/16–19, 23, 27, 37, 85; 210/360.1, 521, 634, 702, 806, 787; 435/4, 6, 287.3

(56) References Cited

U.S. PATENT DOCUMENTS 3,026,719 A * 3/1962 Kopczynski ................. 73/806
3,344,984 A * 10/1967 Kopczynski ................. 494/10

FOREIGN PATENT DOCUMENTS

| | | |
|---|---|---|
| JP | 61-108969 | 10/1985 |
| JP | 2-87070 | 9/1988 |
| JP | 11-148932 | 8/1998 |
| WO | WO 89/04214 | 11/1988 |
| WO | WO 90/08821 | 1/1990 |
| WO | WO 90/11372 | 3/1990 |
| WO | WO90/15320 | 5/1990 |
| WO | WO 91/05861 | 10/1990 |
| WO | WO 91/14003 | 3/1991 |
| WO | WO 93/06239 | 9/1992 |
| WO | WO 93/16391 | 2/1993 |
| WO | WO 95/33986 | 6/1995 |

OTHER PUBLICATIONS

International Search Report from European Patent Office dated Feb. 8, 1993.

Peng Liang and Arthur B. Pardee, "Differential Display of Eukaryotic Messenger RNA by Means of the Polymerase Chain Reaction", Science, vol. 257 (Aug. 14, 1992), pp. 967–971.

(List continued on next page.)

*Primary Examiner*—Joseph Drodge
(74) *Attorney, Agent, or Firm*—Reed Smith LLP; Stanley P. Fisher, Esq.; Juan Carlos A. Marquez, Esq.

(57) ABSTRACT

A centrifugal separator of the invention has a centrifugal rotor (10-1), with symmetric rotation axes, having single sample separation chamber in it for centrifuging samples contained in sample solutions, an upper opening passing through to said sample separation chamber in the upper part, members of frameworks capable of being coupled to said upper opening, a rotation driving means, assuming that the direction of said symmetric rotation axis is the first direction, for driving said centrifugal rotor around said rotation axis in the first direction, wherein assuming that two directions intersecting with said first direction are the second and third directions, the length of said sample preparation chamber in said third direction is longer than the length of said sample preparation chamber in said second direction. Since one kind of sample is handled in one centrifugal rotor, the centrifugal separator of the invention allows discrete treatment (sequential treatment) suitable for the flow system, in which individual samples can be treated independently, making easy automation of sample preparation revolving centrifugation.

16 Claims, 21 Drawing Sheets

OTHER PUBLICATIONS

Andre Marziali, Thomas D. Willis, and Ronald W. Davis, "An Arrayable Flow–through Microcentrifuge for High–throughput Instrumentation", Proc. Natl. Acad. Sci, USA, vol. 96,Jan. 1999, Biochemistry, Engineering, pp. 61–66.

Andre Rosenthal and D. Stephen C. Jones, "Genomic Walking and Sequencing by Oligo–Cassette Mediated Polymerase Chain Reaction", Nucleic Acids Research, vol. 18, No. 10 (Mar. 1990), pp. 3095–3096.

* cited by examiner

A-A' CROSS SECTION

A-A' CROSS SECTION

B-B' CROSS SECTION

CENTRIFUGAL SEPARATOR AND SAMPLE PREPARATION DEVICE USING THE SEPARATOR

This application is a 371 of PCT/JP99/03341, on Jun. 23, 1999.

BACKGROUND OF THE INVENTION

1. Field of the Invention

The present invention is related to a centrifugal separator and a centrifugal rotor and also is related to a centrifuge separation method suitable for separating a sample solute from a solvent and recovering them individually using the centrifugal separator.

2. Description of the Related Prior Arts

Various efforts are being made to elucidate the mechanism of life by measuring polynucleotides such as DNAs and mRNAs in living organisms. Main practical approaches supporting these efforts include; (1) prove testing, which involves preparing a DNA prove with its sequence complementary with a target DNA one another, for determining whether the DNA prove can be hybridized with the target DNA and (2) PCR testing, which requires selection of a region where the target DNA sequence runs, for determining whether a fragment can be PCR-amplified using a pair of DNA primers or for measuring the length of the sequence of the amplified segment and examining the sequence itself.

Since the mechanism of living organs works by means of expression of a wide variety of genes while associating with each other, transcription of the genes contained in chromosomes must be comprehensively examined. In making an attempt to elucidate the mechanism of the development of cancer and hereditary diseases from an aspect of DNAs, it is required to compare mRNAs or identify extensively any difference(s) between normal and variant cells. To measure the mRNAs, first, the mRNAs are extracted from the cells, cDNAs are prepared using reverse transcriptase, and then the specific mRNAs are detected using prove testing or PCR. The methods getting a lot of attraction include Differential Display (Peng Liang and Arthur B. Pardee, Science 258, 967–972 (1992)), by which the mRNAs are compared between the cells or tissues, and Amplified Fragment Length Polymorphisms (WO093/06239). Based on PCR, the latter method amplifies the mRNAs using random primers or arbitrary sequence primers to get their patterns and compares the resulting patterns, allowing the transcription of the mRNAs between the cells or the tissues to be matched.

On the other hand, the Finger Printing method focusing on genome or a specific DNA region has been used on a pilot basis. The Restriction-Enzyme Landmark-Scanning method, first, uses NotI, a rare cutter, to cut the genome into cutting sites, in which labels are introduced. Second, the resulting cutting sites with labels are separated by agarose electrophoresis. The DNAs separated by agarose electrophoresis are further cut into smaller fragments in a gel using a 4-base restriction recognition enzyme and then an agarose gel is spread on a polyacrylamide slab gel. This means that this method is designed to detect a wide variety of genome-derived DNA fragments by 2-dimensional electrophoresis.

In the fields around genome analysis, a need has been increasingly boosted for a method of higher efficient determination of DNA sequences. In place of conventional, manual-based methods of determination of DNA sequences, by which the DNA fragments are labeled using a radioisotope and the lengths of the DNAs are measured by gel electrophoresis, a device (a DNA sequencer), which labels the DNAs with a fluorophore to optically auto-detect the DNA fragments by irradiating a light beam while gel electrophoresis is proceeding, and the determination method of DNA sequences with the DNA sequencer have being spread. The determination methods of DNA sequences, called the Sanger and Dideoxy Chain-Termination methods, are those by which a DNA oligomer, a primer, is hybridized with a target DNA, various lengths of DNA fragments are prepared to be used in determination of DNA sequences by complementary-strand synthesis using an enzyme, and the lengths of the DNA fragments are measured by gel electrophoresis to determine the DNA sequences. The total base length to be determined at the same time by the determination method of DNA sequences may span over from 400 to 700 bases depending on the ability of the gel to separate the fragments. Note that since the determination methods target largely at the genomes and mRNAs and in many cases, the base length to be determined is several kilobases for the mRNAs and is longer than several kilobases for the genomes, respectively, the sequencer cannot determine the entire DNA sequence at the same time.

Conventionally, the Shotgun method has been used for determination of long DNA sequences with several kilobases to several tens kilobases. In case of the Shotgun method, the DNAs are randomly cut into fragments using, for example, an ultrasonic wave, the DNA fragments are cloned and embedded into culture media such as *Escherichia coli*, and then after colonial cultivation, *Escherichia coli* is cultivated in each colony to increase the number of DNA fragment copies. Subsequently, sample DNAs are extracted and DNA analysis, for example, determination of DNA sequences, is carried out. In principle, the Shotgun method, which randomly controls the DNA fragments to remove any overlapping between the DNA fragments, leading to elucidation of a linkage between the DNS fragments, is suitable for the long DNA strands with their sequences unknown and used in the Genome Sequencing Project as a primary method.

The examinations using a DNA prove or PCR, Differential Display, analysis of amplified fragment length polymorphisms, Restriction-Enzyme Landmark-Scanning method, and the determination method of DNA sequences mentioned above are implemented be means of auto-measurement instrumentation with electrophoresis and fluorescent detection by laser irradiation combined therein or auto-hybridization detection instrumentation.

On the other hand, since sample preparation exploiting skills of molecular biology for gene analysis and gene diagnosis involves various processes such as purification of nucleic acid and hydrogen reaction, it is often required that liquid samples should be handled on a minute scale of micro litter. Liquid sample handling necessary for preparation of these samples comprises quantification, transport, retention, mixture, and storage, for each of which a suitable liquid-sample handling tool is commercially available.

As a handling tool for quantification and transport of the liquid samples, a micropipette with a plastic chip is widely used. The micropipette can be used to suck and discharge the liquid sample through an air cylinder using a disposal, plastic chip tube. Plastic sample tubes and multi-well plates are commonly used for retention, mixture, and storage of liquid. Intended to handle liquid samples during purification, in particular, column vessels with a filter are widely spread. Full-automatic equipment, which prepares the samples using these devices and jigs, has been introduced in the market.

Conventionally, the ethanol precipitation method has been usually used for manual preparation of the samples. In case of the ethanol preparation method, the DNAs or the RNAs are precipitated and separated by adding ethanol to prepare a 60–70% of DNA or RNA sample solution in a certain ion environment, followed by centrifugation. Alternately, to remove proteins and lipids from living samples for purification of DNAs or RNAs, the technique, by which phenol is added to a sample mixture to denature and precipitate proteins or by which the lipids are removed by the chloroform extraction method, has been usually used. These techniques requiring centrifugation are essential to molecular biology.

In relation to conventional centrifugation, first of all, centrifugal tubes having samples loaded are mounted on the centrifugal rotors of the centrifugal separator. A batch processing, in which multiple centrifugal tubes are processed at the same time, is essential to centrifugation. In many cases, the quantity of a sample liquid depends on the kind of the sample and when the multiple samples are centrifuged at the same time, the centrifugal tubes associated with the individual samples must have been balanced (the weights of two centrifugal tubes are manually adjusted to be equal to each other) or the centrifugal separator with a auto-balance mechanism must have been used. Furthermore, for the multiple centrifugal tubes having samples loaded to be automatically mounted on the centrifugal rotors of the centrifugal separator one by one, the following steps must be taken; 1) the centrifugal tubes are positioned on the centrifugal rotors, 2) the centrifugal tubes are picked up, 3) a given number of centrifugal tubes are mounted on the centrifugal rotors one by one, and then 4) the centrifugal rotors are started, 5) the rotating centrifugal rotors are stopped and aligned with heir associated stop positions, and finally, 6) the multiple centrifugal tubes are taken out from the centrifugal rotors one by one in the order of mounting on.

Recently, a flow-through type micro-centrifuge, in which the centrifugal tubes can be arrayed for high-throughput instrumentation, has been reported (A. Marziali et al. "An arrayable flow-through microcentrifuge for high-throughput instrumentation" (Proc. Natl. Acad. Sci. USA, Vol. 96, pp. 61–66 (1999))). The report is summarized as follows; with multiple high-speed rotors also serving as sample holders introduced, a miniature flow-through type micro-centrifuge, which achieves high-throughput centrifugation of a large number of samples, has been developed. The small-size rotors of the flow-through type micro-centrifuge are arrayable on a standard microtiter plate having a 96-well spacing, which makes them suitable for an automated processor capable of parallel processing of the multiple samples. The flow-through type micro-centrifuge could be used in place of a standard type centrifuge in various processes, in which only a small number of samples are processed. Techniques have been developed for recovering both supernatants and pellets, as well as for sample mixing and cleaning of the reusable rotors. The report further discusses the schema of applications of the flow-through type micro-centrifuge not only to cell separation and re-suspension but also to DNA purification and condensation, and its implementation method.

The flow-through type micro-centrifuge developed by A. Marziali et al. allows the rotors to rotate at a higher speed, each of which has a space with a V-shape cross section, an upper hole passing through to the V-shape space at its upper part, and a lower hole passing through to the V-shape space at its lower part. When sample solutions containing the samples are injected from the upper holes while the rotors are rotating, both the samples and solvents are forced to move toward the sidewalls of the V-shape spaces by a centrifugal force. When the rotors are stopped, the solvents flow out from the lower holes, while the samples are captured at the sidewalls of the V-shaped spaces.

Since not only the samples centrifuged through the centrifugal process are sensitive to any shock but also centrifuged precipitates are easy to re-mixed with the solvents or to float, a special attention should be paid in handling the centrifuged samples. To automate the centrifugal process, advanced sensing and handling techniques are required, while practical problems with cost and accuracy remain unresolved, preventing a full automatic device, which performs a course of sample preparation processes with the centrifugal process combined automatically, from being building. Furthermore, in considering a full-automatic device integrating an automatic sample preparation process or a measuring system, a problem of batch processing brings out as a deterministic bottleneck. The processes other than centrifugation in sample preparation can be sequentially treated (discretely treated), which means that all the individual samples can be separately processed. An advantage of discrete treatment lies in that the process can be advanced on an assembly-line basis, that it is suitable for automation of the process, and that any interrupt processing is allowed. On the contrary, in case of batch processing, a given batch process has been complete before the next process can start. This imposes such a limitation on batch processing that samples should be supplied from the upper holes, which does not meet a requirement by researchers for rapid availability.

Likewise, since the flow-through type centrifugal separator developed by A. Marziali et al., which is equipped with a different rotor for each of individual samples, has the same array as that of a 96-well micro-plate, it can perform batch processing only. Furthermore, since the flow-through type centrifugal separator has an inlet in the upper part of each rotor, from which a sample is injected, an outlet in the lower part of each rotor, from which the sample is recovered, and a tubing structure connecting between the inlet and the outlet, sample solutions must be injected from the upper inlets in the upper parts of the rotors while the rotors are rotating.

In the biochemical field, considering automation of sample preparation, the system capable of discretely treating all the processes is more preferable than the batch-processing system. No meaningful data could be obtained simply by determining DNA sequences of individual samples as in conventional sample pre-treatment used for determination of DNA sequences in the Human Genome Project and it was required to obtain a certain range of genomes and mRNA sequences together, batch processing capable of parallel-processing multiple samples at the same time was essential to sample preparation. On the other hand, for example, as the Genome Project advances, it will become important to compare narrow regions of the corresponding genomes between heterogeneous solid matters or biological species. Fundamentally, data for each sample will be more significant and probably a requirement will be augmented for rapid sample preparation satisfying needs for urgent assay. Since it is also expected that the number of samples will increase, a method, which successively gives samples processed at a given time interval, is preferable for the system integrating measurement and data processing, which provides higher flexibility and makes system integration easy.

The discrete treatment process, in which usually, sample vessels are successively fed into individual processes of sample preparation one by one, allows easy insertion of sample vessels into a specified different process and has almost no effect on the entire system, that is on the entire processing of all the samples except for a time delay of one process with respect to the samples to be inserted.

SUMMARY OF THE INVENTION

An objective of the invention is to provide a centrifugal separation method, centrifugal rotors, and a centrifugal separator, which cooperatively allow discrete treatment (sequential treatment) and to provide, in particular, the centrifugal separation method and the centrifugal separator, which enable discrete-treatment for recovering and purifying the precipitants of biogenic samples by adding an organic solvent, especially for recovering DNAs and RNAs. Furthermore, another objective of the invention is to provide a sample preparation device suitable for molecular biological samples using a centrifugal separator, which enables discrete treatment, and a sample preparation method using it.

In the centrifugal separator of the invention, sample solutions are added into separation chambers, each of which is disposed in every centrifugal rotor, while the centrifugal rotors remain stationary, upper openings of the centrifugal rotors are closed and then the centrifugal rotors are rotated for centrifugation, and finally individual samples are discretely treated in their associated centrifugal rotors. With respect to the centrifugal rotors having a structure suitable for discrete treatment, the centrifugal separator allowing discrete treatment using the centrifugal rotors, and the discrete treatment sequence, the configuration of the invention is characterized in that:

(A) The centrifugal rotor of the invention has a configuration, in which the upper opening is formed along an axis of symmetry, a rotation axis of the centrifugal rotor (hereafter, simply referred to as the first direction (axis Z), only one sample separation chamber passing through to said upper opening being disposed in the centrifugal rotor. According to the invention, one centrifugal rotor centrifugally separates a given sample therein independently of other samples.

The sample separation chamber and the centrifugal rotor have two symmetric planes, respectively, which intersect with each other, including the rotation axis of the centrifugal rotor.
Assuming that two directions intersecting with the first direction are the second direction (axis X) and the third direction (axis Y), respectively, the precipitants are deposited at the ends of the sample separation chamber in the third direction through centrifugation by making longer the length of the sample separation chamber in the third direction than that in the second direction.

This means that it is assumed that the direction, in which the distance between the ends of the sample separation chamber in the direction normal to the rotation axis of the centrifugal rotor is the maximum, is axis Y (the third direction) and the direction intersecting with axes X and Z is axis X (the second direction).

To facilitate production of the precipitants such as DNAs by centrifugation, the structure of the sample separation chamber, into which a sample to be centrifugally separated is injected, is adjusted so that with respect to the cross section of the sample separation chamber parallel to the XY plane, the cross section at a distance far from axis Z is smaller than that at a distance near axis Z. Furthermore, the sample separation chamber has a concave portion at the bottom with its symmetric planes intersecting with each other including the rotation axis of the centrifugal rotor. When the centrifugal rotor is stopped after centrifugation has been finished, a supernatant liquid obtained by centrifugation is deposited in the concave portion. The supernatant liquid is sucked and discharged from the upper opening of the sample separation chamber.

Subsequently, when a cleaning liquid is added in the sample separation chamber from the upper opening for cleaning the precipitants and the centrifugal rotor is started, the cleaning liquid gets into touch with the precipitants and the precipitants are cleaned. The centrifugal rotor is stopped and the cleaning liquid is sucked out and discharged from the upper opening. Likewise, when a dissolving liquid is added in the sample separation chamber from the upper opening for dissolving the precipitants and the centrifugal rotor is started, the dissolving liquid gets into contact with the precipitants and the precipitants are dissolved. The centrifugal rotor is stopped and the solution containing dissolved precipitants thereof, which is a final product, is sucked out and recovered from the upper opening.

Thus, this simple configuration, in which the sample separation chamber is disposed in the centrifugal rotor, enables easy and speedy cleaning, re-dissolution, and recovery.

(B) The centrifugal rotor of the invention has a configuration, in which the upper and lower openings, both of which run along the symmetry axis, the rotation axis of the centrifugal rotor (in the first direction (axis Z)), only one sample separation chamber passing through to the upper and lower openings is disposed in the centrifugal rotor, and a solution holding vessel having the concave portion for retaining the sample solution to be centrifuged is laid out at the center of the inside of the sample separation chamber. Like that in (A), according to the invention, one centrifugal rotor centrifugally separates a given sample therein independently of other samples.

The solution holding vessel and the sample separation chamber have two symmetric planes, respectively, which intersect with each other, including the rotation axis of the centrifugal rotor. The solution holding vessel is a plate-like concave portion disposed fixedly in the centrifugal rotor. Assuming that two directions intersecting with the first direction are the second direction (axis X) and the third direction (axis Y), respectively, the precipitants are deposited at the ends of the sample separation chamber in the third direction through centrifugation by making longer the length of the sample separation chamber in the third direction than that in the second direction.

This means that it is assumed that the direction, in which the distance between the ends of the sample separation chamber in the direction normal to the rotation axis of the centrifugal rotor is the maximum, is axis Y (the third direction) and the direction intersecting with axes X and Z is axis X (the second direction). A pair of ends of the solution holding vessel are combined with an internal wall in the second direction of the sample separation chamber, while another pair of ends of the solution holding vessel are separated from an internal wall in the third direction of the sample separation chamber without getting into contact with each other. To facilitate production of the precipitants such as DNAs by centrifugation, the structure of the sample separation chamber, into which a sample to be centrifugally separated is injected, is adjusted so that with respect to the cross section of said sample separation chamber parallel to the XY plane, the cross section at a distance far from axis Z is smaller than that at a distance near axis Z. When the centrifugal rotor is stopped after centrifugation has been finished, a supernatant liquid obtained by centrifugation is discharged from the lower opening. According to the second embodiment of the invention, a sample can be added in the solution holding vessel from the upper opening and the supernatant liquid obtained by centrifugation is recovered into a waste vessel from the lower opening.

This means that when the centrifugal rotor is stopped, the sample can be injected into the solution holding vessel for retention, while when the centrifugal rotor is started, the sample solution moves into the sample separation vessel from the solution holding vessel in the radial direction along the rotation axis of the centrifugal rotor, the precipitates are deposited at the ends of the sample separation chamber in the third direction through centrifugation and retained there. When the centrifugal rotor stops, a supernatant liquid produced by centrifugation is discharged from the lower opening into a waste vessel. Subsequently, when a cleaning liquid is added in the solution holding vessel from the upper openings for cleaning the precipitants and centrifuged, the cleaning liquid moves into the sample separation chamber and gets into touch with the precipitants and the precipitants are cleaned. When the centrifugal rotor is stopped, the cleaning liquid is automatically discharged from the lower opening. Likewise, when a dissolving liquid is added in the solution holding vessel from the upper opening for dissolving the precipitants and centrifuged, the dissolving liquid moves into the solution holding vessel and gets into contact with the precipitants and the precipitants are dissolved. When the centrifugal rotor is stopped, the solution containing dissolved precipitants thereof, which is a final product, is automatically charged and recovered from the lower opening.

Thus, this simple configuration, in which the sample separation chamber is disposed in the centrifugal rotor, enables easy and speedy cleaning, re-dissolution, and recovery.

(C) According to the centrifugal separator of the invention, as described in the configurations (A) and (B), the centrifugal rotor is rotated by revolving a cover having a tip, which can be closely engaged with the upper opening for coupling. This means that the centrifugal separator has a configuration, in which engagement of the cover having a motor attached with the upper opening for coupling enabling a rotation moment of the motor to be transmitted to the centrifugal rotor for driving is used as the means for rotation driving. The centrifugal rotor is held by bearings disposed on a periphery around a bottom of the centrifugal rotor, allowing discharge of the waste liquid or the sample solution from the lower opening. According to the invention, a power for driving the rotation system of the centrifugal rotor is supplied from upper part instead of from the bottom as in the conventional concept.

The centrifugal separator suitable for automation can be implemented by combining the configurations (B) and (C), which prevents the samples to contaminate each other, allows the samples to be injected from the upper opening, and after centrifugation has been finished, the sample, a final product, can be recovered. In the time except for those when a sample is added, when a centrifugally-separated supernatant liquid is discharged, when the target precipitants are cleaned, re-dissolved, and recovered, every centrifugal rotor has the cover fitted in its upper opening, preventing the samples from contaminating each other, which often happens to become a problem.

(D) The centrifugal rotor according to the invention, as described in any of the configurations (A), (B), and (C), has a configuration, in which the centrifugal rotor and the sample separation chamber have two symmetric planes, respectively including the rotation axis of the centrifugal rotor, the centrifugal rotor comprises upper and lower parts, and the solution holding vessel is held fixedly in the sample separation chamber of the centrifugal rotor.

Like the configurations (A), (B), and (C), the centrifugal rotor described here has a configuration, in which engagement of the cover having a motor attached with the upper opening formed in the upper part for coupling enabling the rotation moment of the motor to be transmitted to the centrifugal rotor for driving is used as the means for rotation driving. Alternately, according to the configuration (A) of the invention, if the centrifugal rotor comprises both the upper and lower parts, the concave portion is formed having a symmetric axis corresponding to the rotation axis of the centrifugal rotor at the bottom of the lower part. The concave part does not penetrate into the sample separation chamber. It may have the configuration, in which engagement of the cover having a motor attached with the upper opening formed in the upper part for coupling enabling the rotation moment of the motor to be transmitted to the centrifugal rotor for driving is used as the means for rotation driving. Alternately, it has the configuration, in which the direct connection of the motor to the member formed at the bottom of the lower part to transmit the rotation moment of the motor to the centrifugal rotor is used as the means of rotation driving for rotating the centrifugal rotor. Thus, in the configuration (A), the centrifugal rotor can be rotated from any of the upper and lower parts.

(E) The sample preparation device has multiple centrifugal rotors as described in (A)–(D), for each of which the rotation driving system is separately controlled and sample addition, centrifugation, and sample recovery and the like are performed individually. Each of the centrifugal rotors is held in single transport device moving on a given trajectory and can move between a sample addition device and a sample recovery device, enabling sample addition, centrifugation, and sample recovery to be performed for each of centrifugal rotors individually. A mechanism for moving the transport device holding the centrifugal rotor along a guide in a given direction is provided and at a defined interval of the guide, each of the centrifugal rotors is rotated for centrifuging the sample, giving the ability of centrifuging the samples at a desired yield for a given time period. The guide may be formed into a loop shape such as a circle or ellipsoid, each of the centrifugal rotors is moved on the closed loop of trajectory in the given direction, and rotates in the given range of the predetermined, closed loop of trajectory for centrifuging the sample. In the vicinity of the guide, the sample addition devices, the sample recovery devices, and the centrifugal rotors are disposed and the individual centrifugal rotors rotate at the intervals between the sample addition devices and the sample recovery devices for centrifuging the samples. This practically allows an unlimited number of samples to be centrifuged.

(F) According to the sample preparation method of the invention, the discrete treatment sequence can be followed, in which the centrifugal rotors and the multiple rotation driving means for driving the rotation systems of the centrifugal rotors, as described (A)–(D), are used, respectively, the individual centrifugal rotors are moved along the guide in the given direction, and the rotation driving system of the individual centrifugal rotors are independently controlled, enabling separate sample addition, centrifugation, and sample recovery for each of the centrifugal rotors. In the vicinity of the guide, the sample addition device and the sample recovery device are disposed and the individual centrifugal rotors rotate at the intervals between the sample addition devices and the sample recovery devices for centrifuging the samples. In the discrete treatment sequence of the invention, a process, in which the samples are injected into the centrifugal rotors using the sample addition devices, a process, in which the centrifugal rotor is moved along the guide on the trajectory loop for centrifuging the sample, and a process, in which the supernatant liquid obtained by centrifugation is discharged using the solution discharging device, are sequentially performed for each centrifugal rotor. Furthermore, not only the sample addition device and the solution discharging device are disposed on the guide but also a solvent addition device is placed in the vicinity of the guide, which enables the process, in which the sample is injected into the centrifugal rotor, the process, in which the centrifugal rotor is moved along the guide on the trajectory loop to produce the precipitants by centrifugation, the process, in which the supernatant liquid obtained by centrifugation is discharged using the solution discharging device, the process, in which a solvent is added using the solvent addition device, the precipitates obtained by centrifugation are dissolved into a solute, and the process, in which the solute containing dissolved precipitants is recovered in the sample recovery device to be independently performed for each of the centrifugal rotors.

According to the invention, since one kind of sample is treated in single rotor, a problem of vexatious complication with the rotors of the centrifugal separators manufactured by the conventional arts, for example, positioning of multiple centrifugal tubes is eliminated and automatic sample preparation including centrifugation is facilitated. Furthermore, according to the invention, an unlimited number of samples can be practically centrifuged.

DESCRIPTION OF THE PREFERRED EMBODIMENTS

Out of drawings used in the following descriptions of embodiments, FIG. 7, FIG. 9, FIG. 10, FIG. 12, FIG. 14, FIG. 15, and FIG. 18 are one-side sectional views, of which half parts, projections, show outlines while the other halves show cross sections, all of which are simply referred to as sectional views in the descriptions hereafter.

Embodiment 1

Figure 1:
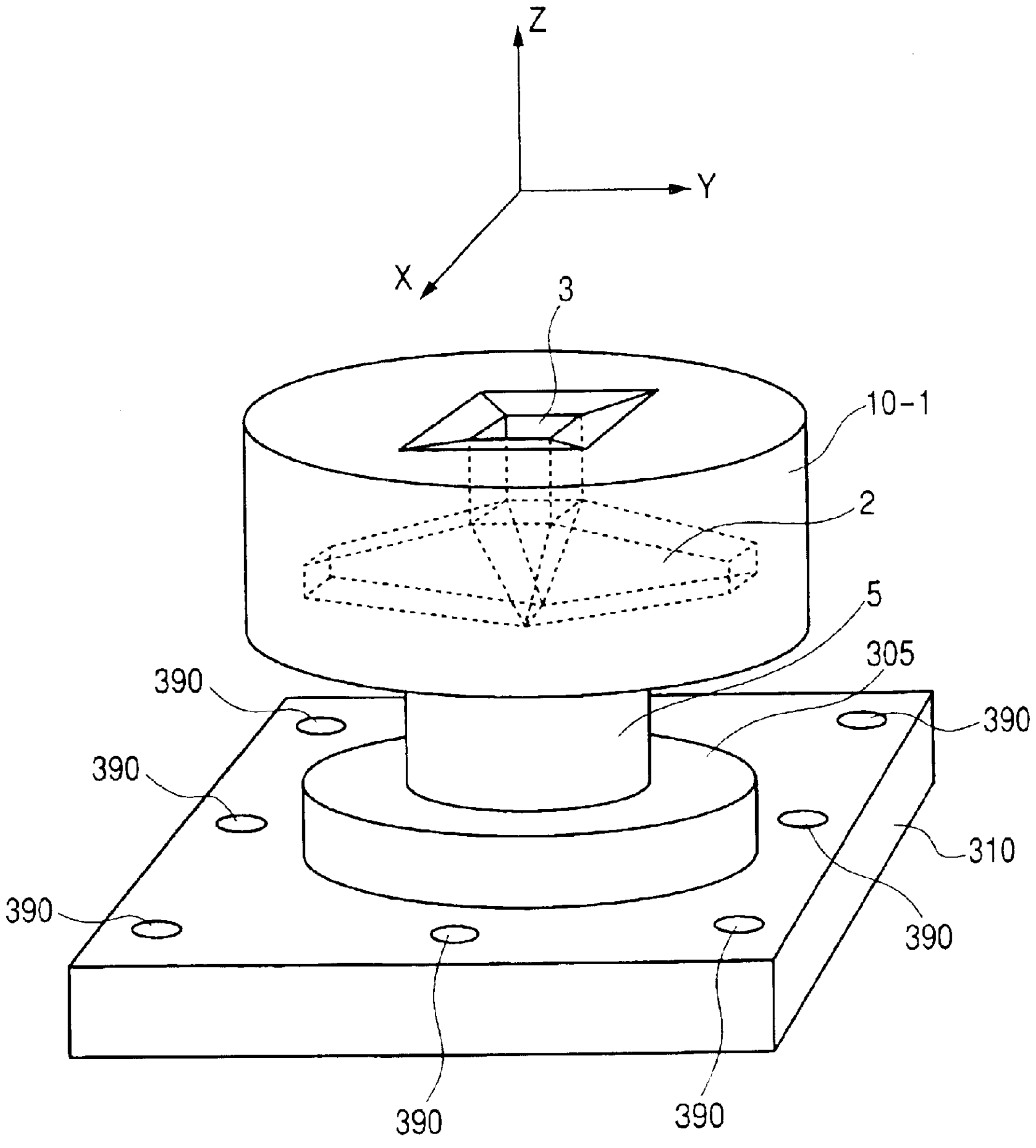
FIG. 1 is a perspective view showing a configuration of a centrifugal separator according to Embodiment 1 of the invention.

FIG. 1 is a perspective view showing a configuration of a centrifugal separator according to Embodiment of the invention. The centrifugal separator according to Embodiment of the invention is suitable for discrete treatment. As shown in FIG. 1, the centrifugal separator comprises a centrifugal rotor 10-1, a lower rotation axis 5 directly connected between a bottom of the centrifugal rotor 10-1 and a motor 305, and a motor stand 310 supporting the motor 305. The motor stand 310 is fixedly held on, for example, a testing bench or a transport plate through a fixing hole 390. Inside the centrifugal rotor 10-1, only one sample separation chamber 2 is disposed and an upper opening 3 is formed on a top of the centrifugal rotor, from which sample solutions are injected and recovered, the upper opening 3 passing through to the sample separation chamber 2. A cover 100, which also serves as an upper rotation axis, is coupled to an axis of a motor not indicated in FIG. 1 and FIG. 2. The upper opening 3 is closely engaged with a square pole and a frustum disposed at the tip of the cover 100 for coupling.

Figure 2:
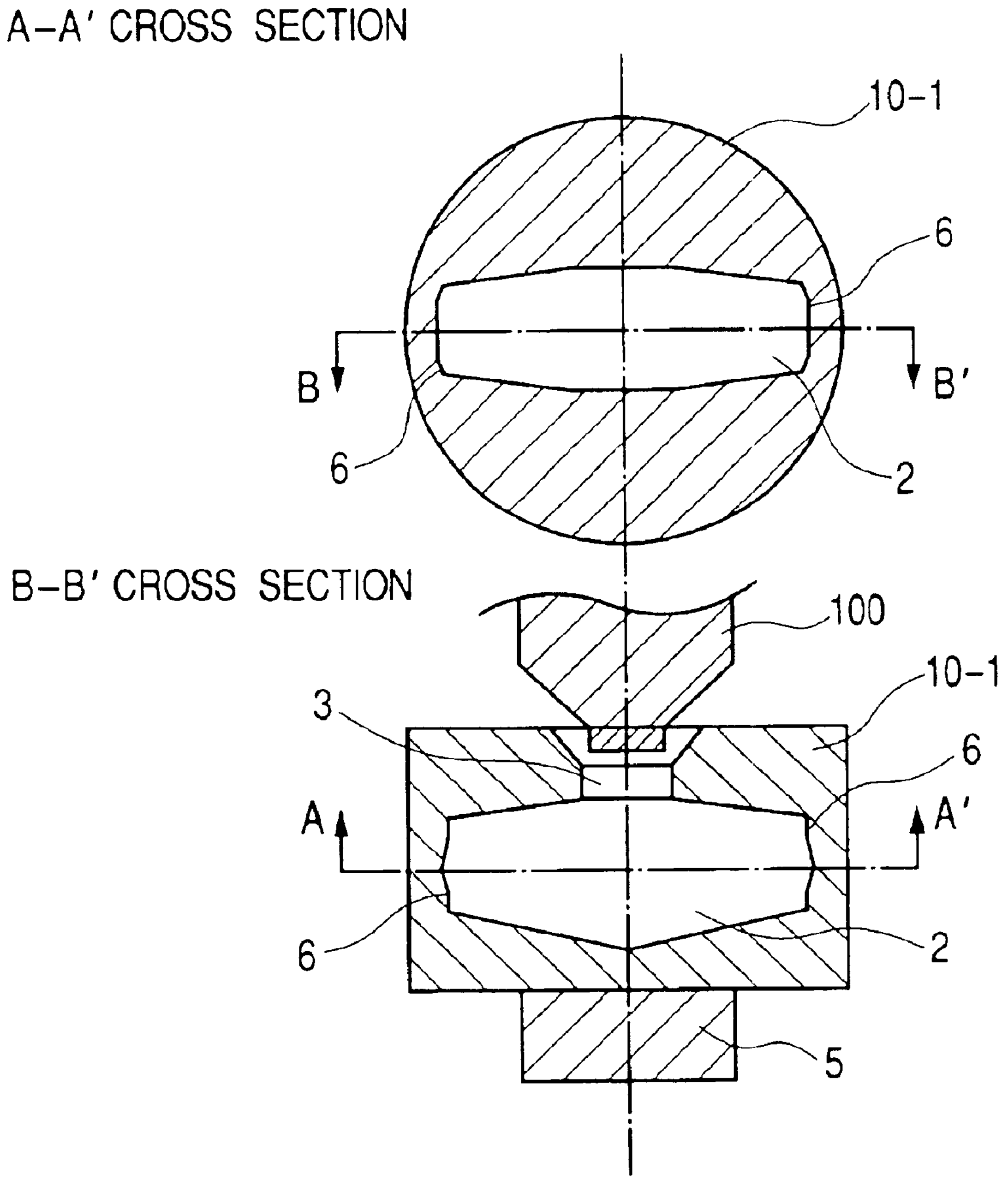
FIG. 2 is a sectional view showing a centrifugal rotor according to Embodiment 2 of the invention.

FIG. 2 shows a sectional view (A—A' sectional view) in a plane, normal to the rotation axis (the first direction, axis Z) of the centrifugal rotor 10-1, including a direction (axis Y), in which the maximum length of the sample separation chamber 2 lies and a sectional view (B—B' sectional view) in a plane including the direction (axis Y), in which the maximum length of the sample separation chamber 2 lies, including the rotation axis Z. The centrifugal rotor 10-1 has only one sample separation chamber 2. The sample separation chamber 2 has two symmetric planes (YZ plane, XZ plane) intersecting one another including the rotation axis.

As shown in FIG. 1 and FIG. 2, the sample separation chamber 2 has a slender shape stretching toward the third direction intersecting with the rotation axis and its cross sectional area normal to the third direction becomes smaller toward the third direction from axis Z. The maximum size of the sample separation chamber 2 in the third direction is longer than the maximum size of the sample separation chamber 2 in the second direction (axis Z). The bottom of the sample separation chamber 2 has a taper structure.

Since the rotation system of the centrifugal rotor 10-1 is driven by a lower rotation axis 5 and an upper rotation axis, its rotation moment can be dispersed, allowing smaller motors to centrifuge samples.

The centrifugal rotor 10-1 shown in FIG. 1 and FIG. 2 has a diameter of 50 mm and a height of 20 mm. The maximum sizes of the sample separation chamber 2 in the Z (rotation axis) direction, the Y direction, and the X direction are 15 mm, 30 mm, and 10 mm, respectively and up to 0.3 ml (milliliter) of sample solution can be added into the sample separation chamber 2 for centrifugation.

Hereafter, giving an example of recovery of 50 .1 (micro liter) of solution (0.1 pmol) by ethanol sedimentation using a PCR amplified double-strand DNA sequence with 230-base length as a sample, how to use the centrifugal separator according to Embodiment 1 is explained. 5 .1 of sodium acetate solution (3M concentration, pH 5.5) and 130 .1 of ethanol are mixed into the sample solution. The mixture is left at 20 for ten minutes and then 180 .1 of mixture is added into the sample separation chamber 2 from the upper opening 3 using an automatic dividing injector. The cover 100 also serving as the upper rotation axis is closely engaged with the upper opening 3 for coupling. The centrifugal rotor 10-1 is rotated at 15000 rpm for 15 minutes to deposit DNAs at the ends 6 of the sample separation chamber 2.

After the centrifugal rotor is stopped, the cover 100 is removed and the supernatant liquid deposited is sucked out from the taper portion of the bottom of the sample separation chamber 2. To remove excessive salt, 250 .1 of 70% cold ethanol solution is added in the sample separation chamber 2, the cover 100 is put again, and centrifugation is performed at 10000 rpm. Remove the cover 100 and 70% cold ethanol solution is removed from the sample separation chamber using the suction apparatus. At that point, the DNA precipitates have been yet left in the ends 6 of the sample separation chamber 2. A dry air is blown into the sample separation chamber 2 to remove some residue ethanol. Subsequently, to recover DNA precipitates produced by ethanol sedimentation from the sample separation chamber 2, 50 .1 of sterile water is added, the cover 100 is put again, and centrifugation is performed at 10000 rpm to dissolve the precipitated DNAs. After the centrifugal rotor 100 is stopped, the cover is removed and the purified DNA solution is recovered from the upper opening 3 using the automatic dividing injector.

Thus, measurement of the purified and recovered DNAs showed that the absorbance of 50 .1 of recovered solution was 0.052 at a concentration of 260 nm. Since the concentration of a double-strand DNA sequence is 50 .g/ml (milliliter) at an absorbance of 1.0, 50 .1 of DNAs with a concentration of 2.6 ./ml exists. this means that 0,13 .1 of DNAs exists. Considering that the molecular weight of the DNAs is 151800 Daltons, 0.86 pmol of DNAs have been recovered because a DNA sequence has 230-base length. The recovery rate (yield) of DNAs is 86%, which is clearly quite compatible to those by the commonly used centrifugal separators based on the conventional arts.

Alternately, it might be acceptable as mode 1 of Embodiment 1 that in the same manner as that for Embodiment 5 described later, a screw hole is formed instead of the upper opening 3 of the centrifugal rotor according to Embodiment 1, a sample solution is added into the sample separation chamber 2, and a volt, which fits into the screw hole, is used as the cover instead of the cover 100 also serving as the upper rotation axis to seal the screw hole. Furthermore, as mode 2 of Embodiment 1, it might be acceptable that a mechanism for locking the cover, which is fallen into the upper opening 3 of the centrifugal rotor 10-1 according to Embodiment 1 and plugs the upper opening 3 instead of the cover 100 also serving as the upper rotation axis, is mounted on the centrifugal rotor 10-1 to seal the upper opening 3.

Embodiment 2

Figure 3:
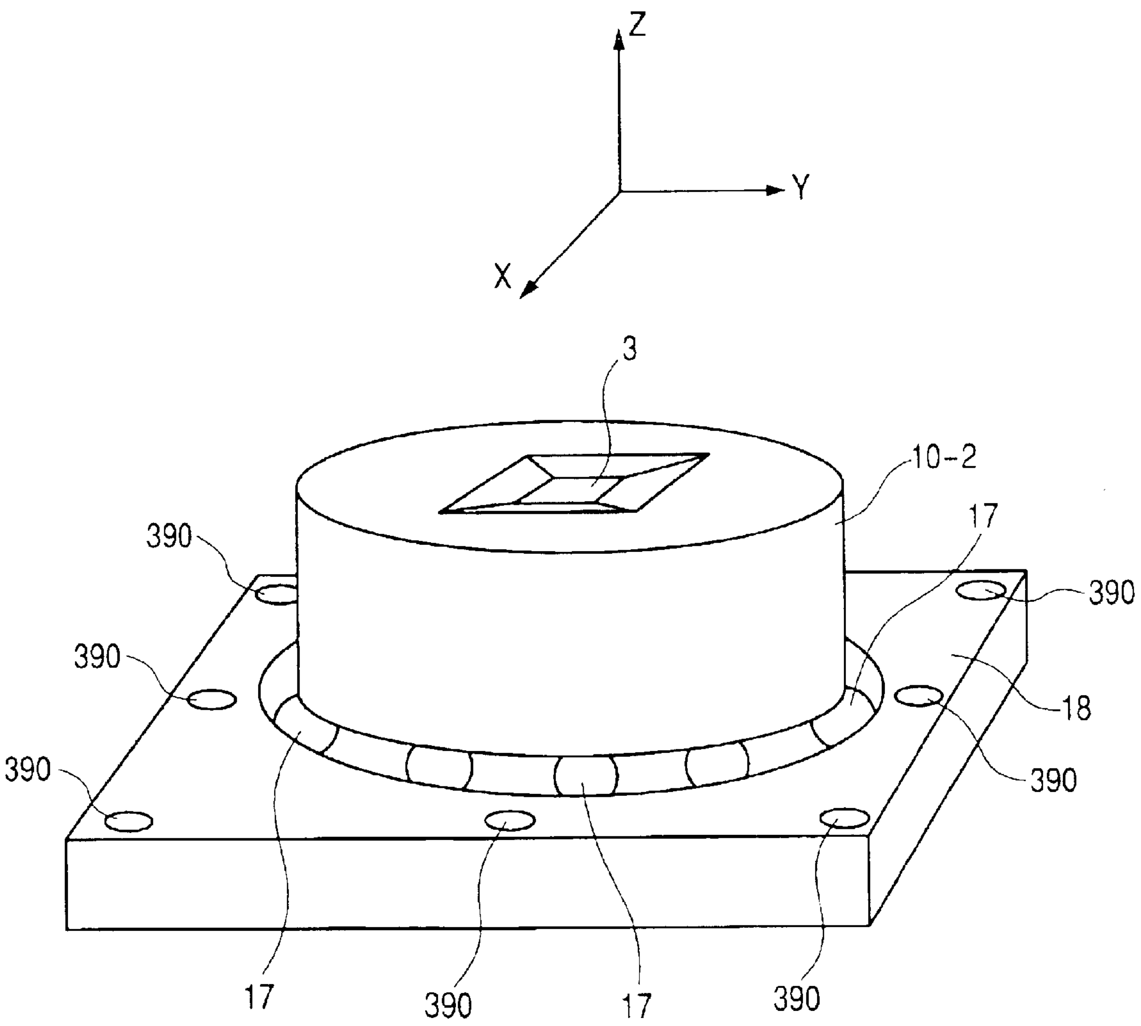
FIG. 3 is a perspective view showing a configuration of a centrifugal separator according to Embodiment 3 of the invention.

FIG. 3 is a perspective view showing a configuration of a centrifugal separator according to Embodiment 2 of the invention. The centrifugal separator shown in FIG. 3 is suitable for discrete treatment. As shown in FIG. 3, the centrifugal separator comprises a centrifugal rotor 10-2 and a centrifugal rotor-supporting stand 18, which supports the bottom of the centrifugal rotor 10-2 in the rotatable state by means of multiple abrasion-resistance rigid balls. The centrifugal rotor-supporting stand 18 is fixedly held on, for example, a test bench or a transport plate, through a fixing hole 390.

Figure 4:
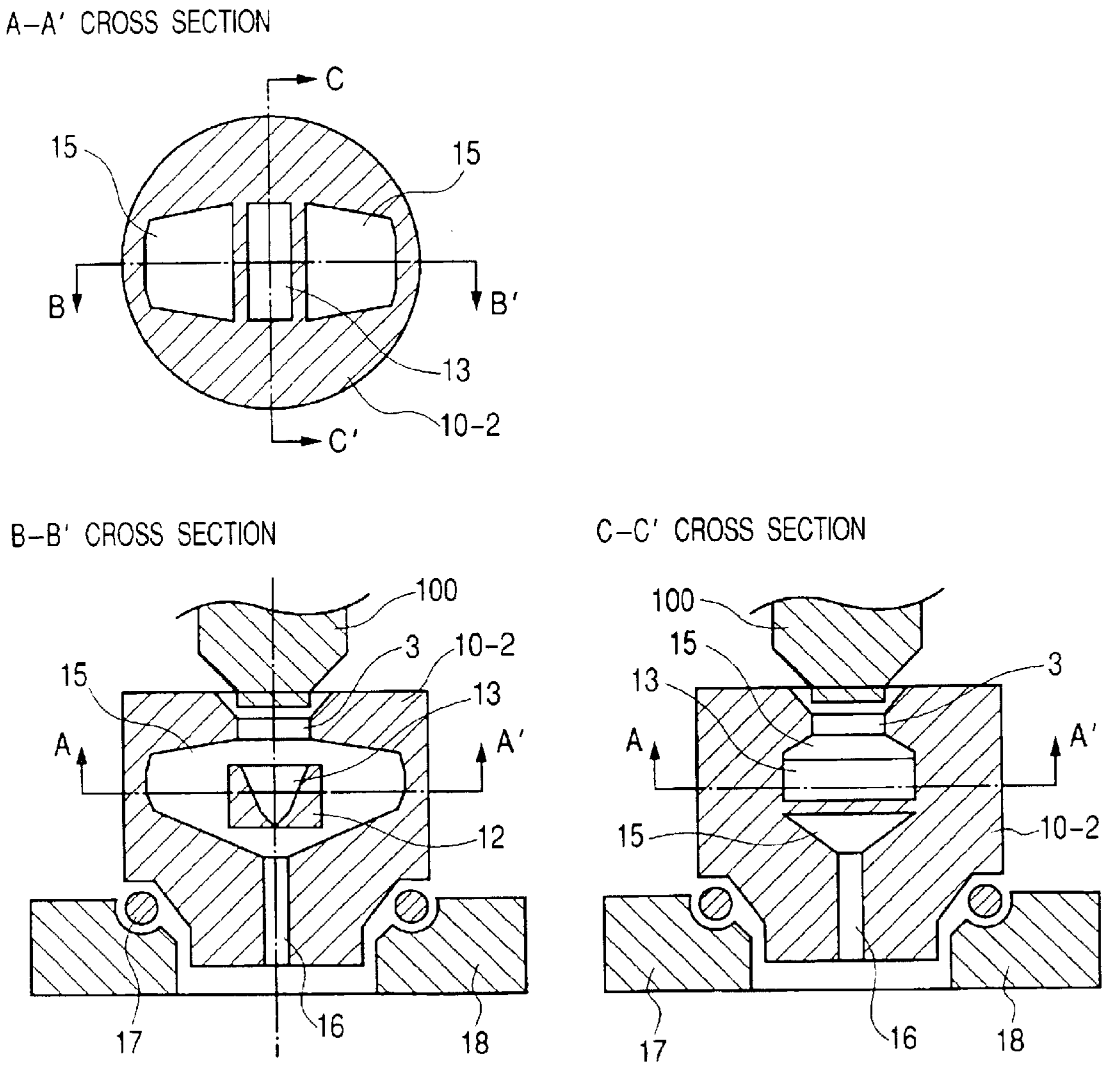
FIG. 4 is a sectional view showing a centrifugal rotor according to Embodiment 2 of the invention.

FIG. 4 shows a sectional view (A—A' sectional view) in a plane including a direction (axis Y), in which the maximum length of the sample separation chamber 15 lies, normal to a rotation axis (the first direction, axis Z) of the centrifugal rotor 10-2, a sectional view (B—B' sectional view) in a plane including the rotation axis (axis Z) and the direction (axis Y), in which the maximum length of the sample separation chamber 15 lies, and a sectional view (C—C' sectional view) in a plane including a direction (axis X) intersecting with the direction (axis Y), in which the maximum length of the sample separation chamber 15 lies, including the rotation axis (axis Z).

Inside the centrifugal rotor 10-2, one the sample separation chamber 15 is disposed and the upper opening 3 is formed at the top of the centrifugal rotor for injecting and recovering sample solutions. In the centrifugal separator 10-2, intended to automate injection of sample solutions and recovery of waste solutions, a solution holding vessel 12 having a concave portion 13 in the sample separation chamber 15 is disposed. The upper opening 3 passes through to the sample separation chamber 15 and the solutions injected enter into the concave portion 13 of the solution holding vessel. At the bottom of the sample separation chamber 15, a lower opening 16 is formed for discharging waste solutions from the centrifugal rotor 10-2.

The solution holding vessel 12 is separated from the inner wall of the centrifugal rotor 10-2 in the direction, in which the maximum length of the sample separation chamber 15 lies, including the rotation axis (axis Z) while the solution holding vessel 12 connects to the inner wall of the centrifugal rotor 10-2 in the direction intersecting with the direction, in which the maximum length of the sample separation chamber 15 lies, including the rotation axis. In other words, the solution holding vessel 12 has a taper-shape concave portion in the direction intersecting with the direction, in which the maximum length of the sample separation chamber 15 lies, including the rotation axis.

The solution holding vessel 12 having the concave portion 13 in the vicinity of the sample separation chamber 15, and the sample separation chamber have two symmetric planes (YZ plane, XZ plane), respectively, which intersect one another, including the rotation axis (axis Z).

The cover 100 also serving as the rotation axis is coupled to the axis of the motor not indicated in FIG. 3 and FIG. 4. The upper opening 3 is closely engaged with the square pole and the frustum at the tip of the cover 100 for coupling. The tip of the cover 100 also serving as the upper rotation axis is coupled to the upper opening 3 and the rotation moment of the motor is transmitted to the centrifugal rotor 10-1.

Figure 5:
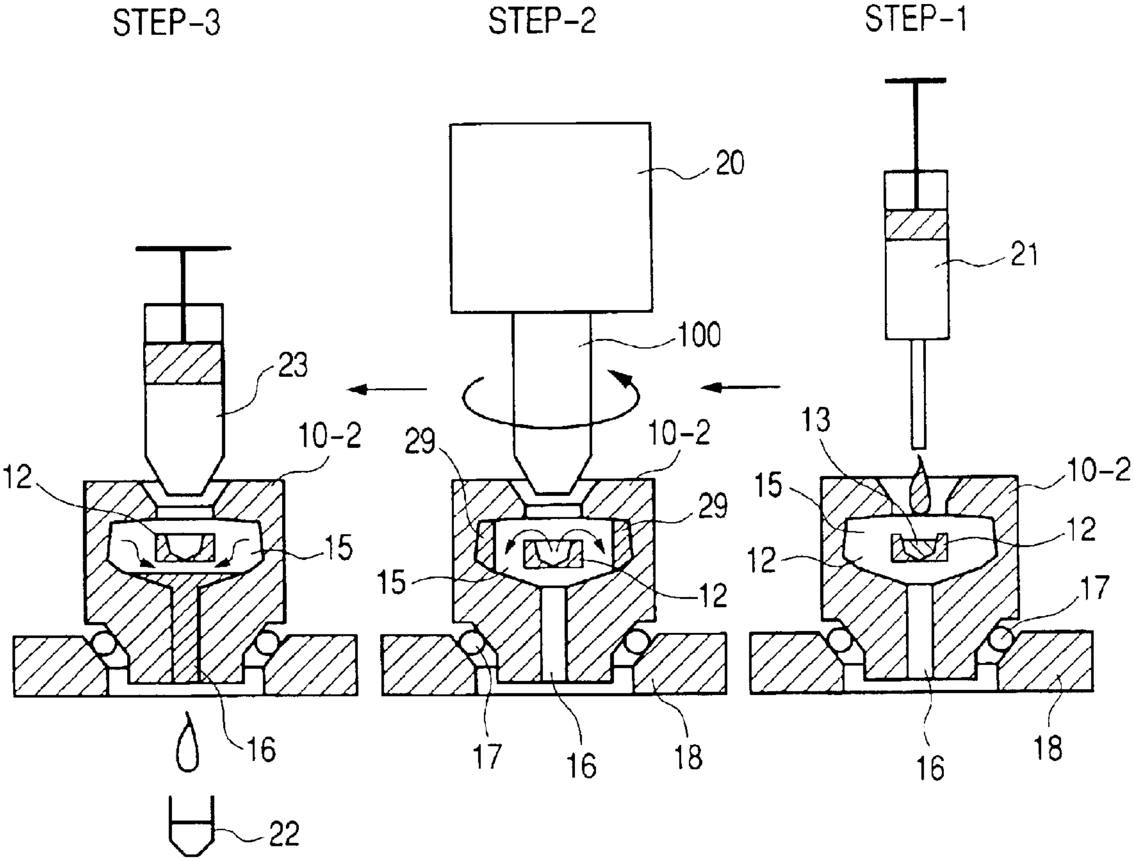
FIG. 5 is a sectional view explaining a procedure for centrifugation using the centrifugal separator according to Embodiment 2 of the invention.

According to the configuration mentioned above, with the centrifugal rotor 10-2 stopped, when the sample is injected into the concave portion of the solution holding vessel 12 and retained and then the centrifugal rotor 10-2 is started, the sample solution moves in the radial direction along the rotation axis and enters from the concave portion of the solution holding vessel 12 into the sample separation chamber 15, resulting in the precipitates by centrifugation. The precipitates are deposited on the internal wall of the sample separation chamber 15 in the direction, in which the maximum length of the sample separation chamber 15 lies. When the centrifugal rotor 10-2 is stopped, the supernatant liquid obtained centrifugation is automatically discharged from the lower opening 16. As shown in FIG. 4 and FIG. 5, since the centrifugal rotor stand 18 has a space, in which the lower opening 16 is formed around the rotation axis of the centrifugal rotor 10-2, the discharged supernatant liquid obtained by centrifugation can be easily recovered.

With respect to the centrifugal rotor 10-2 according to Embodiment 2, the solution holding vessel 12 having the concave portion 13 is disposed in the sample separation chamber 15, production, cleaning, re-dissolution, and recovery of the precipitates are easily performed.

FIG. 5 is a sectional view (B–B7 sectional view shown in FIG. 4) in the plane including the direction, in which the maximum length of the sample separation chamber 15 lies, including the rotation axis (axis Z), explaining the procedure for a centrifugation process using the centrifugal separator according to Embodiment 2 of the invention. The sample used in the descriptions of FIG. 5 is exactly identical to that used in Embodiment 1. After the mixture used in Embodiment 1 is left at 20 for 10 minutes, 180 .1 of mixture is injected into the concave portion 13 of said solution holding vessel 12 from the upper opening 3 using an automatic dividing injector 21 (step-1). For a moment, the solution is retained in the concave portion 13 of the solution holding vessel 12. When the centrifugal rotor 10-2 is started, the sample solution is forced to splash into the sample separation chamber 15 by a centrifugal force (step-2).

The cover 100 also serving as the upper rotation axis connected to a motor 20 is closely engaged with the upper opening 3 and the centrifugal rotor 10-2 is rotated for a given time period for centrifugation, resulting in the precipitates. When the centrifugal rotor 10-2 is stopped to cease centrifugation, the supernatant liquid obtained by centrifugation moves into the bottom of the sample separation chamber 15 and is discharged from lower opening 16 (step-3).

As a result, only the precipitates are left on the inner wall of the sample separation chamber of the centrifugal rotor 10-2. Subsequently, 70% of ethanol is injected into the concave portion of the solution holding vessel 12 from an opening 14 as a cleaning liquid using the automatic dividing injector 21 (step-1).

Subsequently, when the centrifugal rotor 10-2 is rotated for centrifugation, the cleaning liquid moves into the sample separation chamber 15 and gets into contact with the precipitates to dissolve excessive salt (step-2).

When the centrifugal rotor is stopped to cease centrifugation, the cleaning liquid is automatically discharged from the lower opening 16 (step-3).

Likewise, when 100.l of sterile water is injected as a dissolving liquid into the concave portion of the solution holding vessel (step-l) and the centrifugal rotor is started for centrifugation, the dissolving liquid moves into the sample separation chamber 15 and gets into contact with the precipitates to dissolve the precipitates (step-2).

When the centrifugal rotor is stopped to cease centrifugation, the solution containing the dissolved precipitants is automatically discharged from the lower opening 16 and recovered into a recovery vessel 22 (step-3).

To increase the recovery rate of the solution containing the dissolved precipitants, by applying air pressure using a pressurizer 23, the residual solution is recovered from, for example, the lower opening 16. The amount of the liquid recovered this way was 97 .l. In the same way as that of Embodiment 1, the recovery rate computed based on the measurement of the absorbency of the recovered solution was 89%.

The centrifugal separator 10-2 shown in FIG. 3, FIG. 4, and FIG. 5 has a diameter of 44 mm and a height of 46 mm. The maximum sizes of the sample separation chamber 15 in the Z (rotation axis) direction, the Y direction, and X direction are 16 mm, 35 mm, and 18 mm, respectively and up to 0.5 ml of sample solution may be injected into the sample separation chamber 15 for centrifugation.

Embodiment 3

Figure 6:
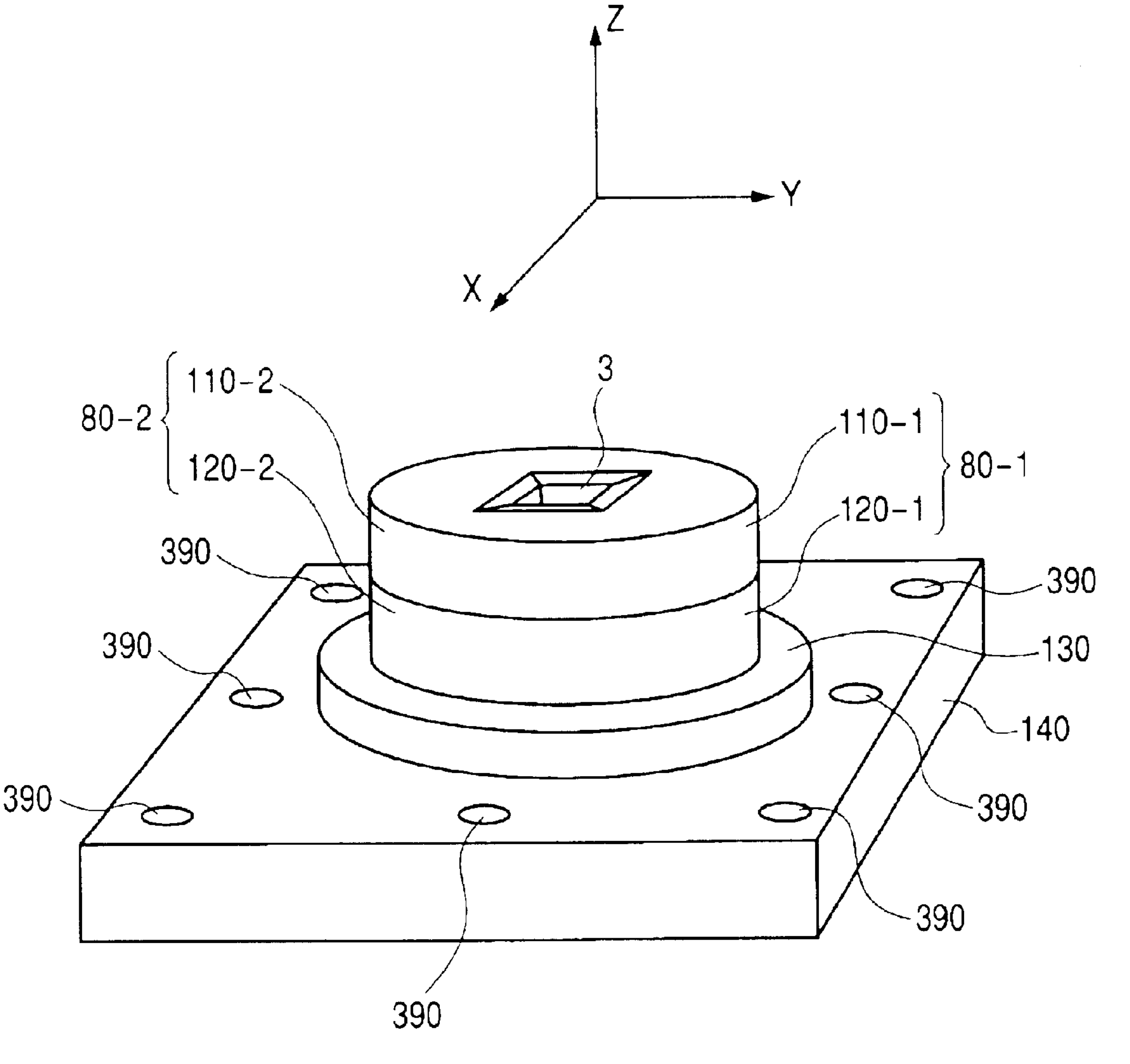
FIG. 6 is a perspective view showing a configuration of a centrifugal separator according Embodiment 3 of the invention.

FIG. 6 is a perspective view showing a configuration of a centrifugal separator according to Embodiment 3 of the invention. The centrifugal separator shown in FIG. 6 is suitable for discrete treatment. As shown in FIG. 6, the centrifugal separator comprises a centrifugal rotor 80-1 comprising an upper part 110-1 having the upper opening 3 and a lower part, a bearing 130 supporting the centrifugal rotor 80-1 in the rotatable state by means of multiple abrasion-resistance rigid balls 131 (FIG. 7), and a centrifugal rotor supporting stand 140 supporting the bearing 130. The centrifugal rotor-supporting stand 140 is fixedly held on, for example, a test bench or a transport plate through a fixing hole 390.

Figure 7:
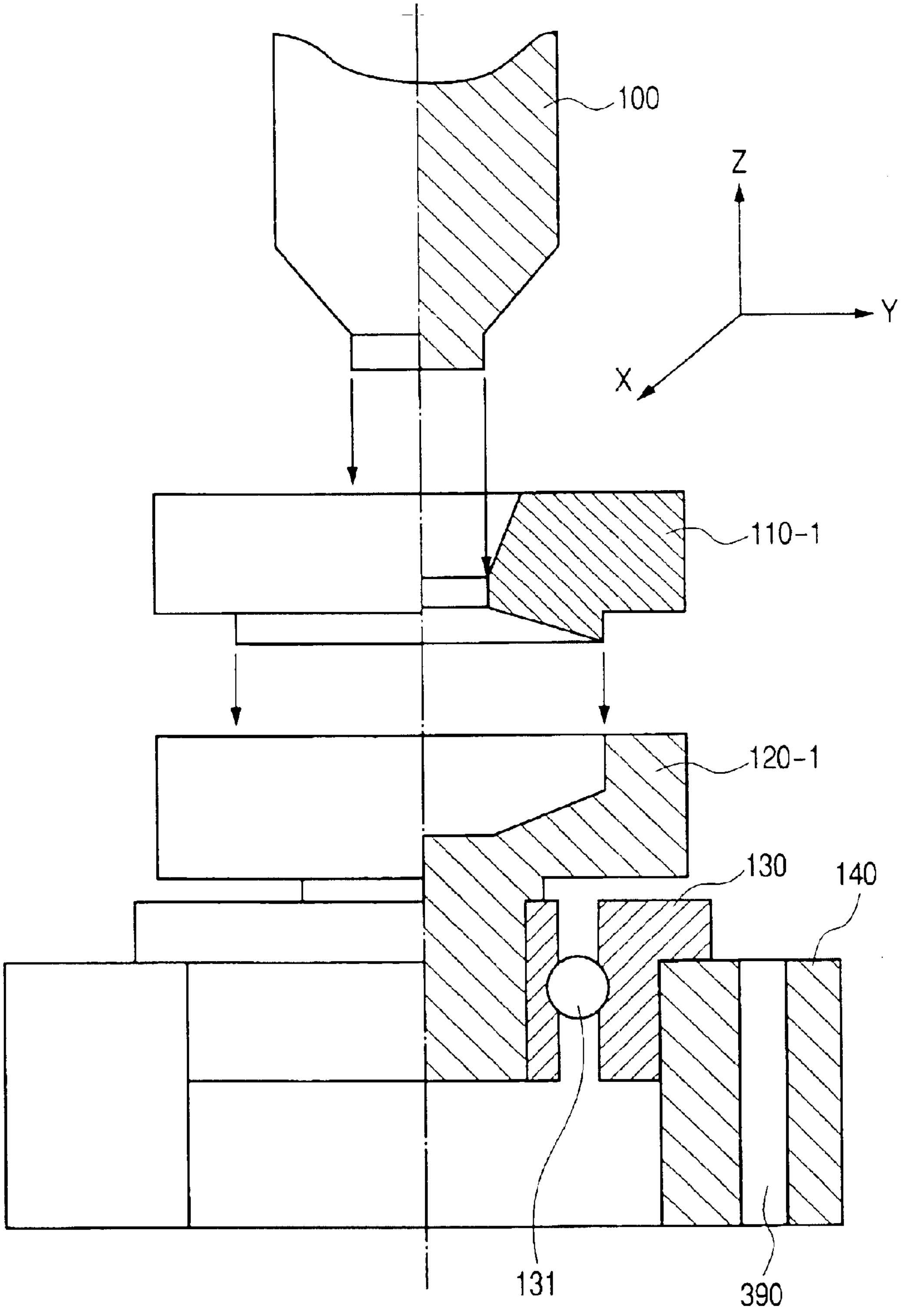
FIG. 7 is a sectional view showing a centrifugal rotor according to Embodiment 3 of the invention.

FIG. 7 is a sectional view in a plane including the direction (axis Y), in which the maximum length of a sample separation chamber 70 lies, including the rotation axis (axis Z) of the centrifugal rotor 80-1 of the centrifugal separator according to Embodiment of the invention. The centrifugal rotor 80-1 comprises the upper part 110-1 and the lower part 120-1. The fit between the upper part 110-1 and the lower part 120-1 defines the sample separation chamber 70 in the centrifugal rotor 80-1. The upper part 110-1 has the upper opening 3, with which the cover 100 also serving as the rotation axis connected to the motor is closely engaged. The lower part 120-1 is fitted with the baring 130.

Figure 8:
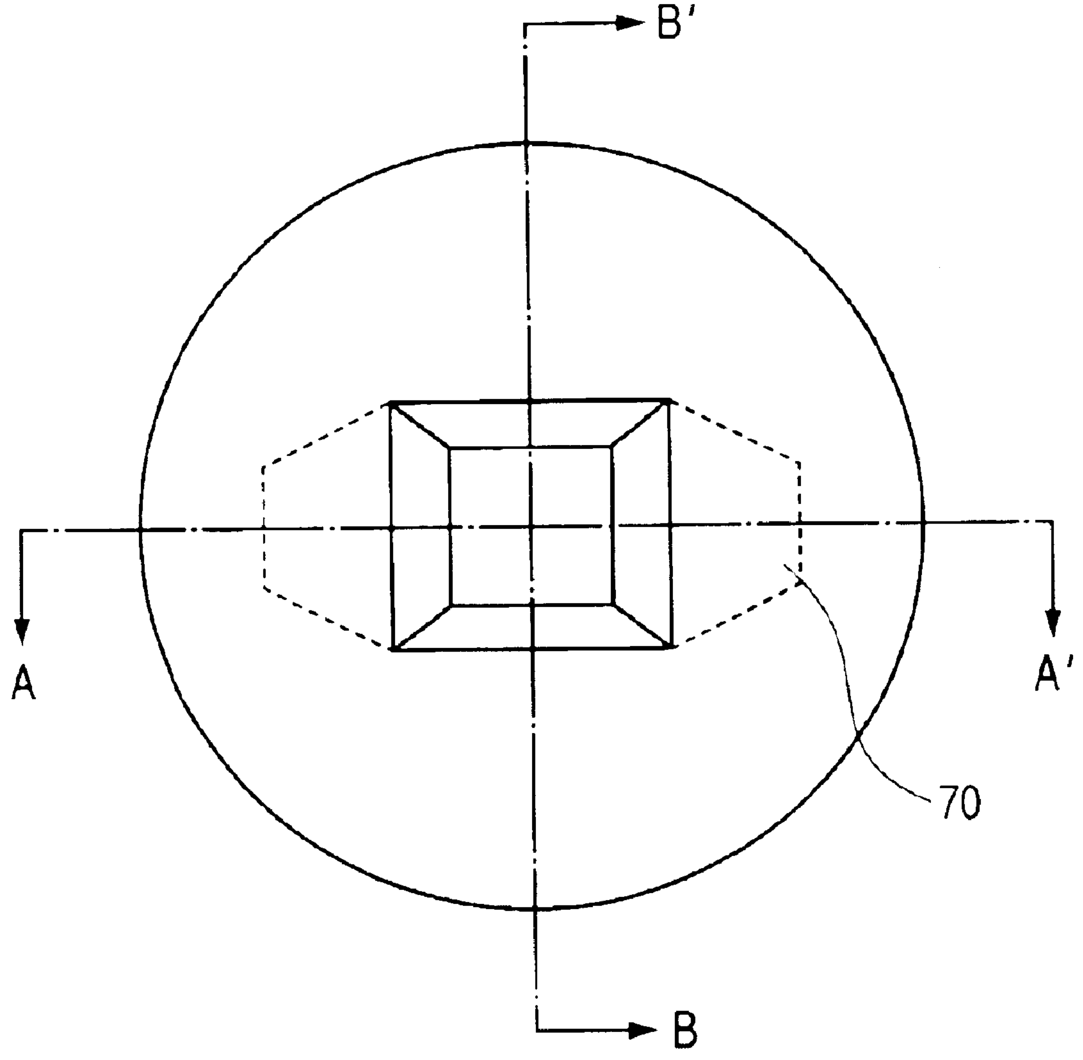
FIG. 8 is a plan view showing the centrifugal rotor according to Embodiment 3 of the invention.
Figure 9:
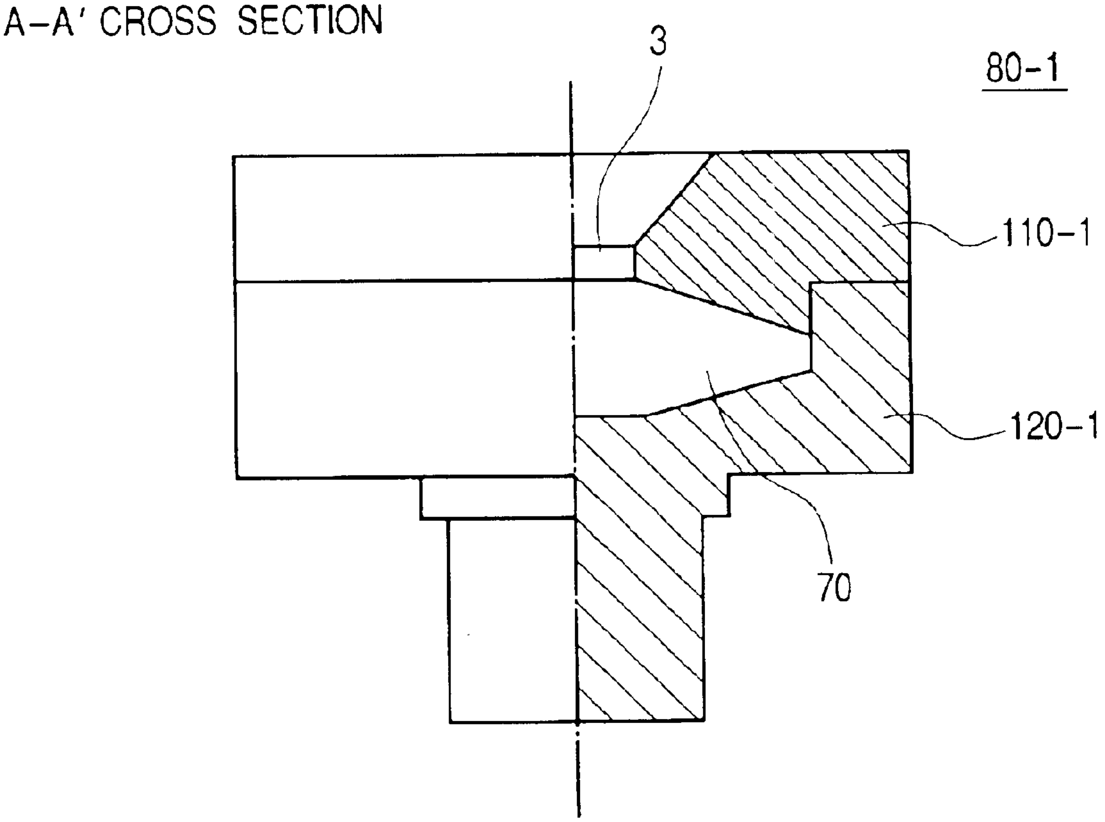
FIG. 9 and FIG. 10 are sectional views showing the centrifugal rotor according to Embodiment 3 of the invention.
Figure 10:
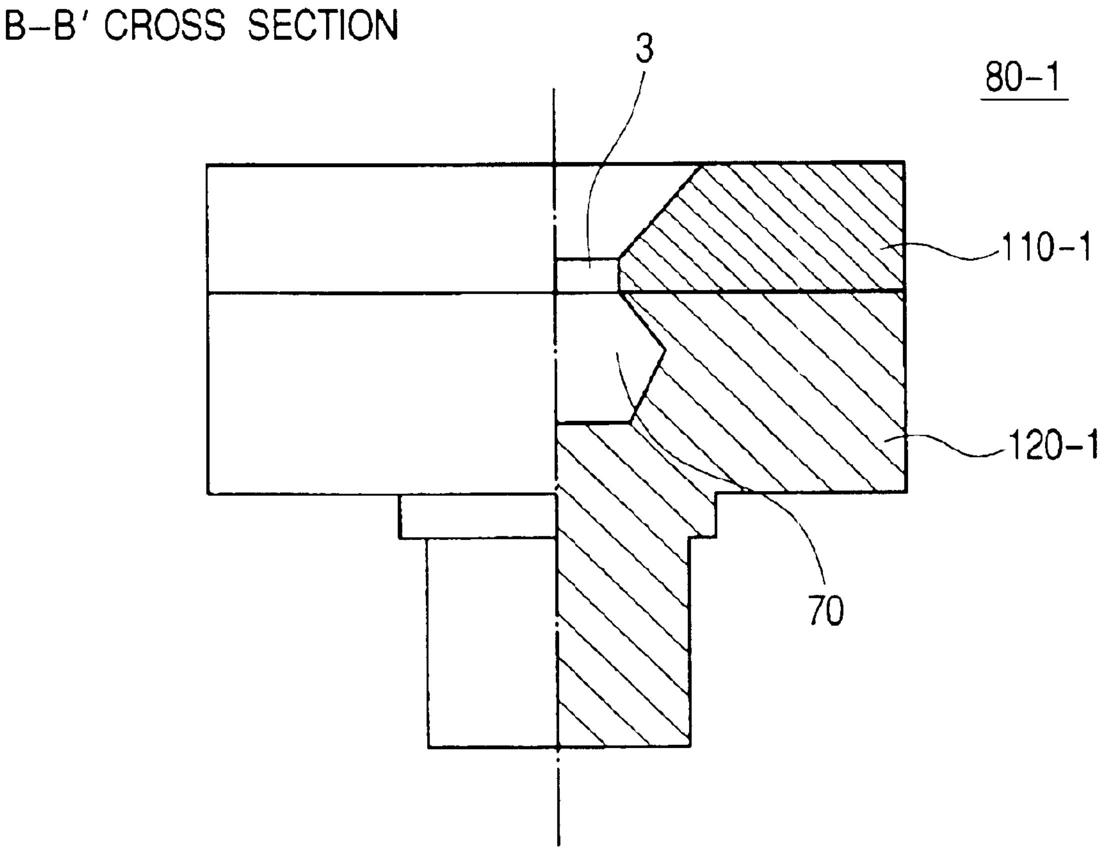

FIG. 8 is a plan view showing the centrifugal rotor 80-1 according to Embodiment 3 of the invention, FIG. 9 is a sectional view (A—A' sectional view shown in FIG. 8) in the plane including the direction (axis Y), in which the maximum length of the sample separation chamber 70 lies, including the rotation axis (axis Z) of the centrifugal rotor 80-1 according to Embodiment 3 of the invention, and FIG. 10 is a sectional view (B—B' sectional view shown in FIG. 8) in the plane including the direction (axis X) intersecting with the direction (axis Y), in which the maximum length of the sample separation chamber 70 lies, including the rotation axis (axis Z) of the centrifugal rotor 80-1 according to Embodiment 3 of the invention. After the sample is injected into the sample separation chamber 70 from the upper opening 3, the upper opening 3 is closely engaged with the square pole and the frustum at the tip of the cover 100 also serving as the upper rotation axis for coupling. The tip of the cover 100 is coupled to the upper opening 3 and the rotation moment is transmitted to the centrifugal rotor 80-1.

Figure 11:
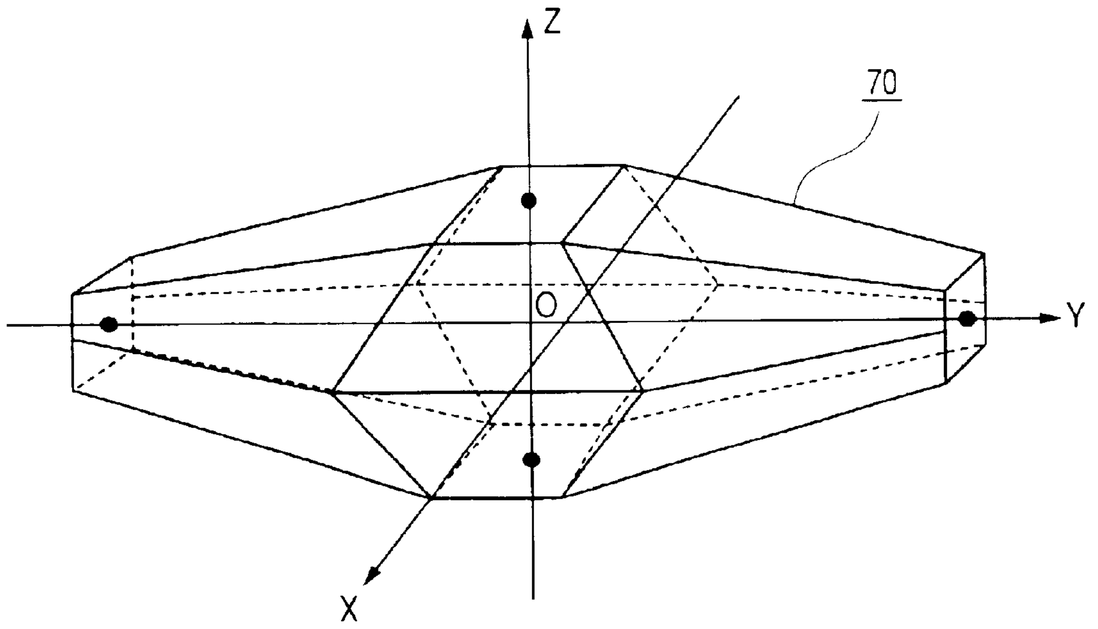
FIG. 11 is a perspective view showing a shape of a sample separation chamber of the centrifugal rotor according to Embodiment 3 of the invention.

FIG. 11 is a perspective view showing a shape of the sample separation chamber 70 of the centrifugal rotor 80-1 according to Embodiment 3 of the invention. With respect to the sample separation chamber 70, which is defined by fitting the upper part 110-1 with the lower part 120-1, it is assumed that the rotation axis of the centrifugal rotor 80-1 is axis Z (the first direction), the direction, in which the maximum length of the sample separation chamber 70 lies, normal to the rotation axis is axis Y (the third direction), and the direction, in which the minimum length of the sample separation chamber 70 lies, is axis X (the second direction). The sample separation chamber 70 has two symmetric planes (XY plane, XZ plane), which intersect one another, including the rotation axis (axis Z). The area of the cross section parallel to the ZY plane of the sample separation chamber 70 become smaller as it goes far from axis Z. The sample separation chamber 70 has a concave portion, into which the supernatant liquid obtained by centrifugation enters when the centrifugal rotor is stopped to cease centrifugation, and the precipitates are deposited on the inner walls of the ends in the direction, in which the maximum length of the sample separation chamber 70 lies.

As known from FIG. 6, the centrifugal rotor 80-1 shown in FIG. 11 has a diameter of 40 mm and a height of 20 mm. The maximum sizes of the sample separation chamber 70 in the Z direction, the Y direction, and the X direction are 9 mm, 28 mm, and 12 mm, respectively and up to 0.2 ml of sample solution can be injected into the sample separation chamber 70 for centrifugation.

Embodiment 4

FIG. 6 is a perspective showing a configuration of a centrifugal separator according to Embodiment 4 of the invention. The centrifugal separator shown in FIG. 6 is suitable for discrete treatment. As shown in FIG. 6, the centrifugal separator comprises a centrifugal rotor 80-2 comprising an upper part 110-2 having the upper opening 3 and a lower part 120-2, the bearing 130 supporting the centrifugal rotor 80-2 in the rotatable state by means of multiple abrasion-resistance rigid balls 131, and the centrifugal rotor supporting stand 140 supporting the bearing 130. The centrifugal rotor-supporting stand 140 is fixedly held on, for example, a test bench or a transport plate through the fixing hole 390.

Figure 12:
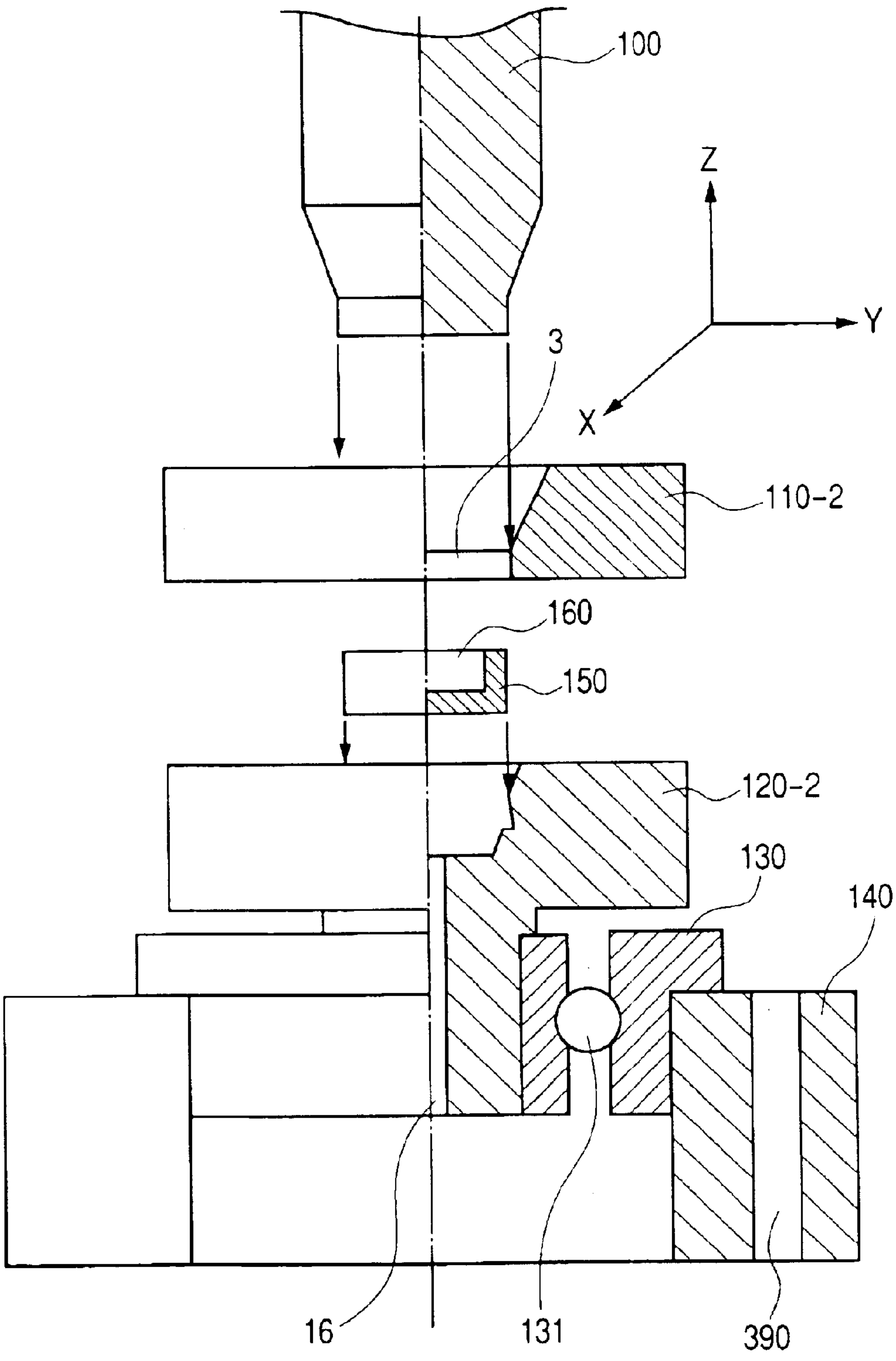
FIG. 12 is a sectional view showing a centrifugal separator according to Embodiment 4 of the invention.

FIG. 12 is a sectional view in the plane including the direction (axis Y), in which the maximum length of the sample separation chamber 70 lies, including the rotation axis (axis Z) of the centrifugal rotor 80-2 according to Embodiment 4 of the invention. The centrifugal rotor 80-2 comprises the upper part 110-2 and the lower part 120-2. The lower opening 16 penetrating the lower part 120-2 is formed, into which a solution holding vessel 150 having a concave portion 160 is fitted. The fitting of the upper part 110-2 having the solution holding vessel 150 fitted with the lower part 120-2 defines the sample separation chamber 70 in the centrifugal rotor 80-2. The upper part 110-2 has the upper opening 3, with which the cover 100 also serving as the upper rotation axis connected to the motor is closely engaged. The lower part 120-2 of the centrifugal rotor 80-2 is fit into the bearing 130.

Figure 13:
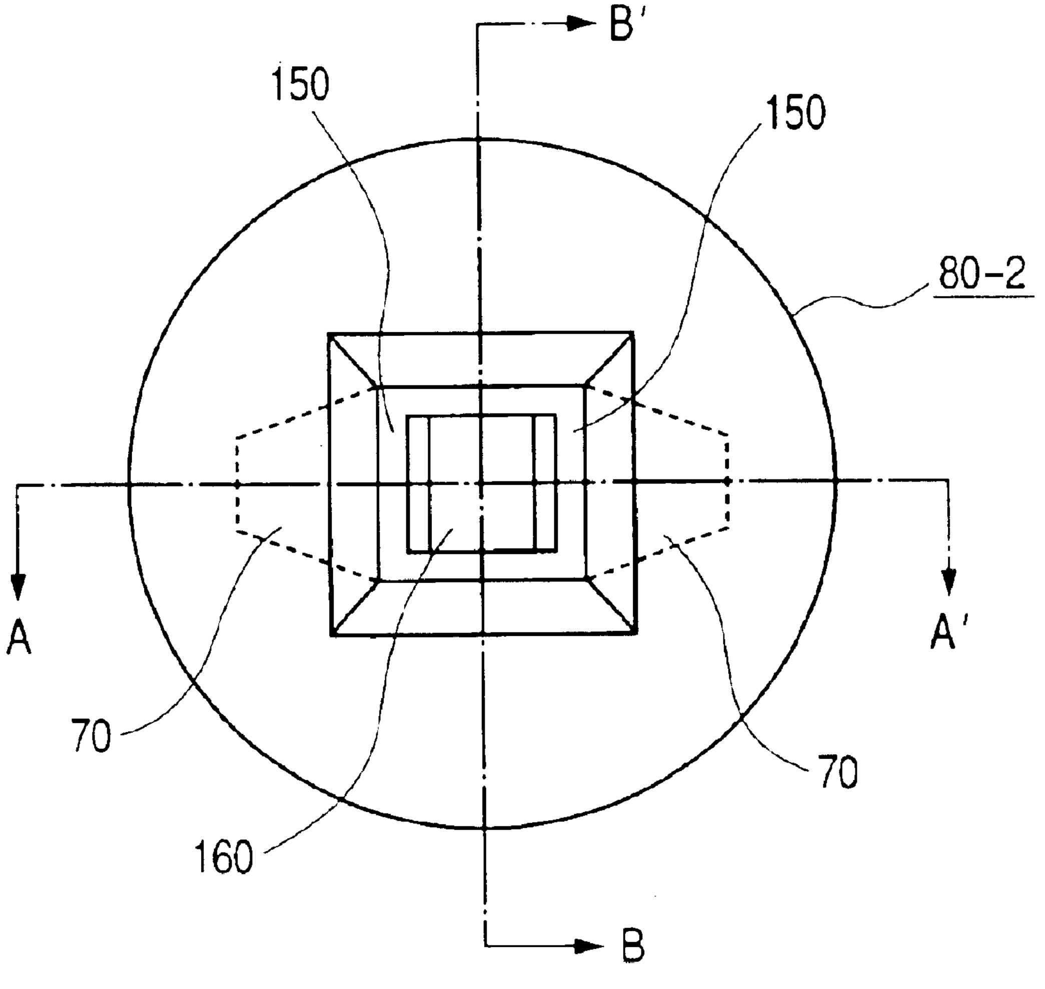
FIG. 13 is a plan view showing a centrifugal rotor according to Embodiment 4 of the invention.
Figure 14:
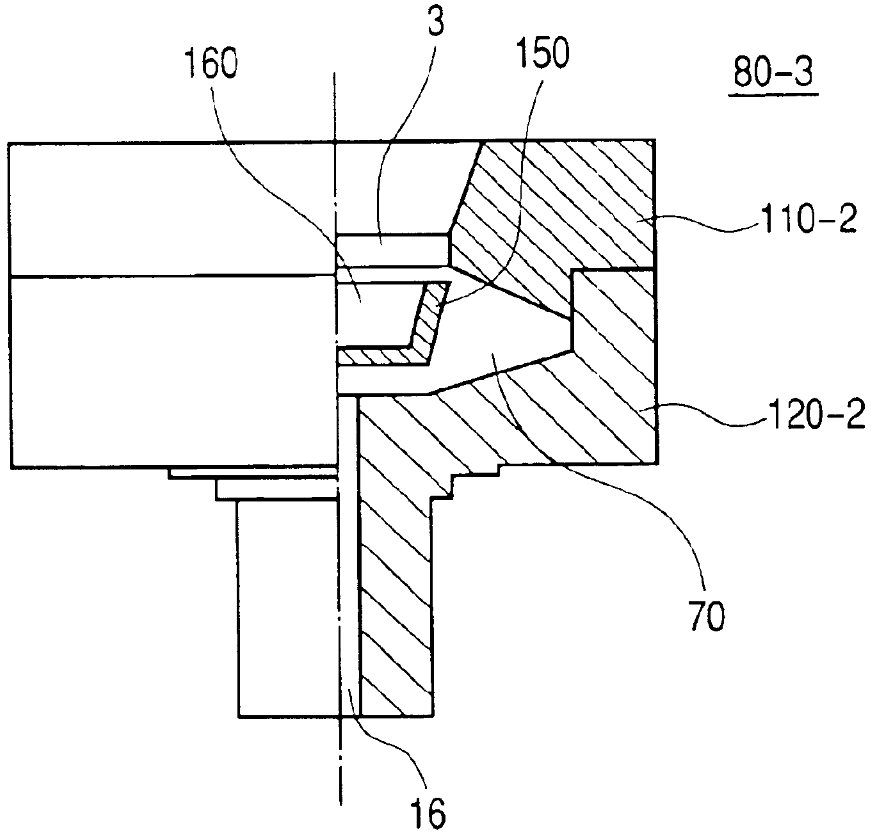
FIG. 14 and FIG. 15 are sectional views showing the centrifugal rotor according to Embodiment 4 of the invention.
Figure 15:
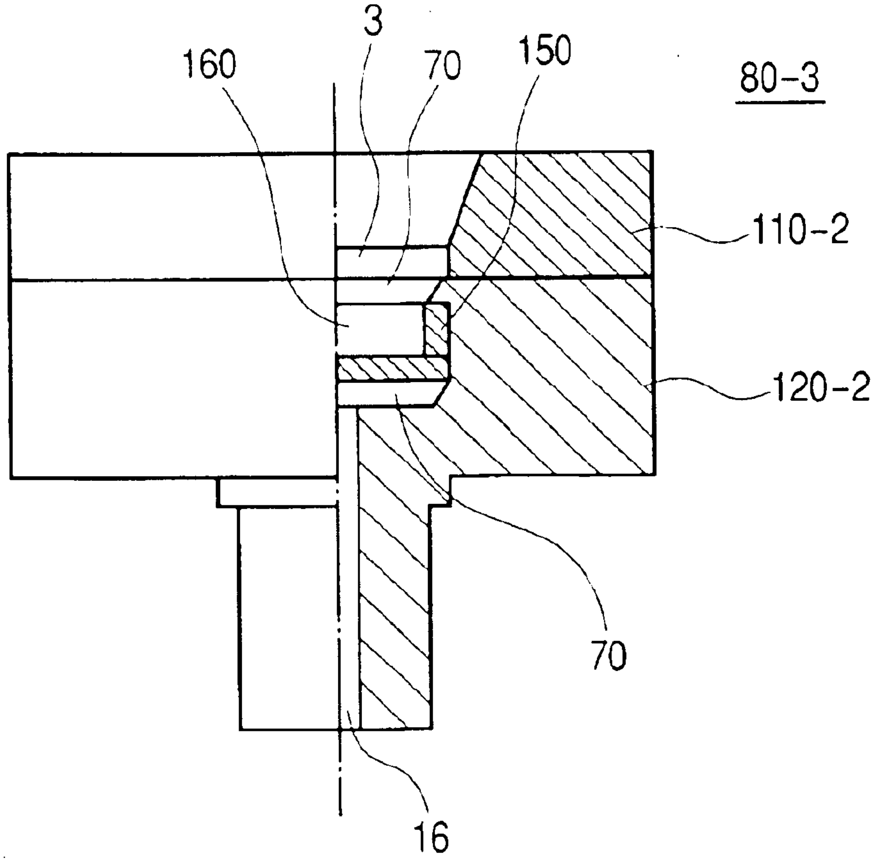

FIG. 13 is a plan view showing the centrifugal rotor 80-2 according to Embodiment 4 of the invention, FIG. 14 is a sectional view (A—A' sectional view shown in FIG. 13) in the plane including the direction (axis Y), in which the maximum length of the sample separation chamber 70 lies, including the rotation axis (axis Z) of the centrifugal rotor 80-2 according to Embodiment 4 of the invention, and FIG. 15 is a sectional view (B—B' sectional view shown in FIG. 13) in the plane including the direction (axis X) intersecting with the direction (axis Y), in which the maximum length of the sample separation chamber 70 lies, including the rotation axis (axis Z) of the centrifugal rotor 80-2 according to Embodiment 4 of the invention. After the sample is injected into the concave portion 160 of the solution holding vessel 150 in the sample separation chamber 70 from the upper opening 3, the upper opening 3 is closely engaged with the square pole and the frustum at the tip of the cover 100 also serving as the upper rotation axis for coupling. The tip of the cover 100 is coupled to the upper opening 3 and the rotation moment of the motor is transmitted to the centrifugal rotor 80-2.

Figure 16:
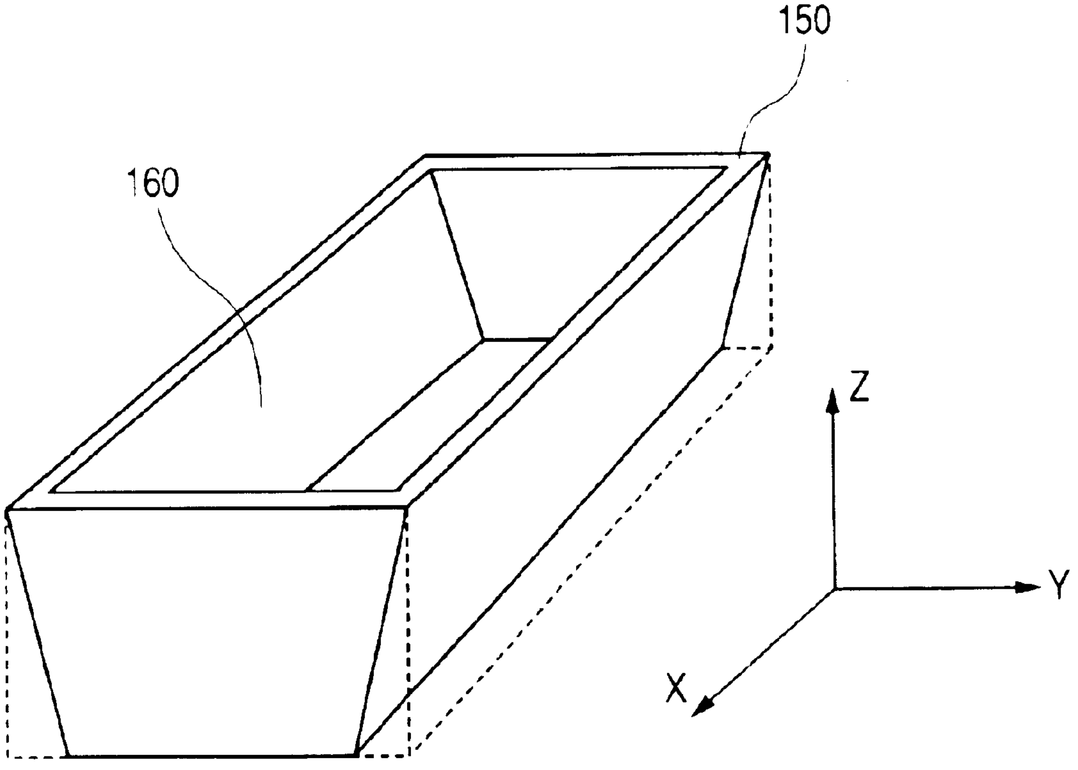
FIG. 16 is a perspective view showing a shape of a solution holding vessel disposed in the sample separation chamber of the centrifugal rotor according to Embodiment 4 of the invention.

FIG. 16 is a perspective view showing a shape of the solution holding vessel 150 having the concave portion disposed in the sample separation chamber 70 of the centrifugal rotor 60-2 according to Embodiment 4 of the invention. The solution holding vessel 150 having the concave portion in the vicinity of the sample separation chamber 70 and the sample separation chamber 70 have two symmetric planes (XY plane, XZ plane) respectively, which intersect one another, including the rotation axis (axis Z) of the centrifugal rotor 80-2. The length of the solution holding vessel 150 in axis X is longer than the length of the solution holding vessel 150 in axis Y. The ends of the solution holding vessel 150 in the axis X direction are fitted with the lower part 120-2. It might be acceptable that the ends of the solution holding vessel 150 in the axis X direction are hot welded, adhered, or fixed using screws with the lower part 120-2. The parts except for the ends of the solution holding vessel 150 in the axis X direction do not get into contact with the inner wall of the sample separation chamber 70, that is they are separated from the inner wall.

With the solution holding vessel 150 disposed in the sample separation chamber 70 as described above, when the centrifugal rotor 80-2 is rotated for centrifugation, the sample solution injected into the concave portion of the solution holding vessel 150 smoothly moves from the concave portion into the sample separation chamber 70. The precipitates obtained by centrifugation are deposited on the inner walls of the ends of the sample separation chamber 70 in the direction, in which the maximum length of the sample separation chamber 70 lies. When the centrifugal rotor 80-2 is stopped to cease centrifugation, the supernatant liquid obtained by centrifugation is automatically discharged from the lower opening 16.

In the same way as that of the centrifugal rotor 10-2 according to Embodiment 2, since with respect to the centrifugal rotor 80-2, the solution holding vessel 150 having the concave portion 160 is disposed in the sample separation chamber 70, the production, cleaning, re-dissolution, and recovery of the precipitates are easily performed.

The centrifugal rotor 80-2 shown in FIG. 6 and FIG. 13–FIG. 16 has a diameter of 340 mm and a height of 20 mm. The maximum sizes of the sample separation chamber 70 in the Z (the rotation axis) direction, Y direction, and X direction are 8 mm, 30 mm, and 14 mm, respectively. The sizes of the concave portion 160 of the solution holding vessel 150 in the Z direction, the Y direction, and the X direction are 5 mm, 12 mm, and 14 mm, respectively and up to 0.3 ml of sample solution is injected for centrifugation.

Embodiment 5

Figure 17:
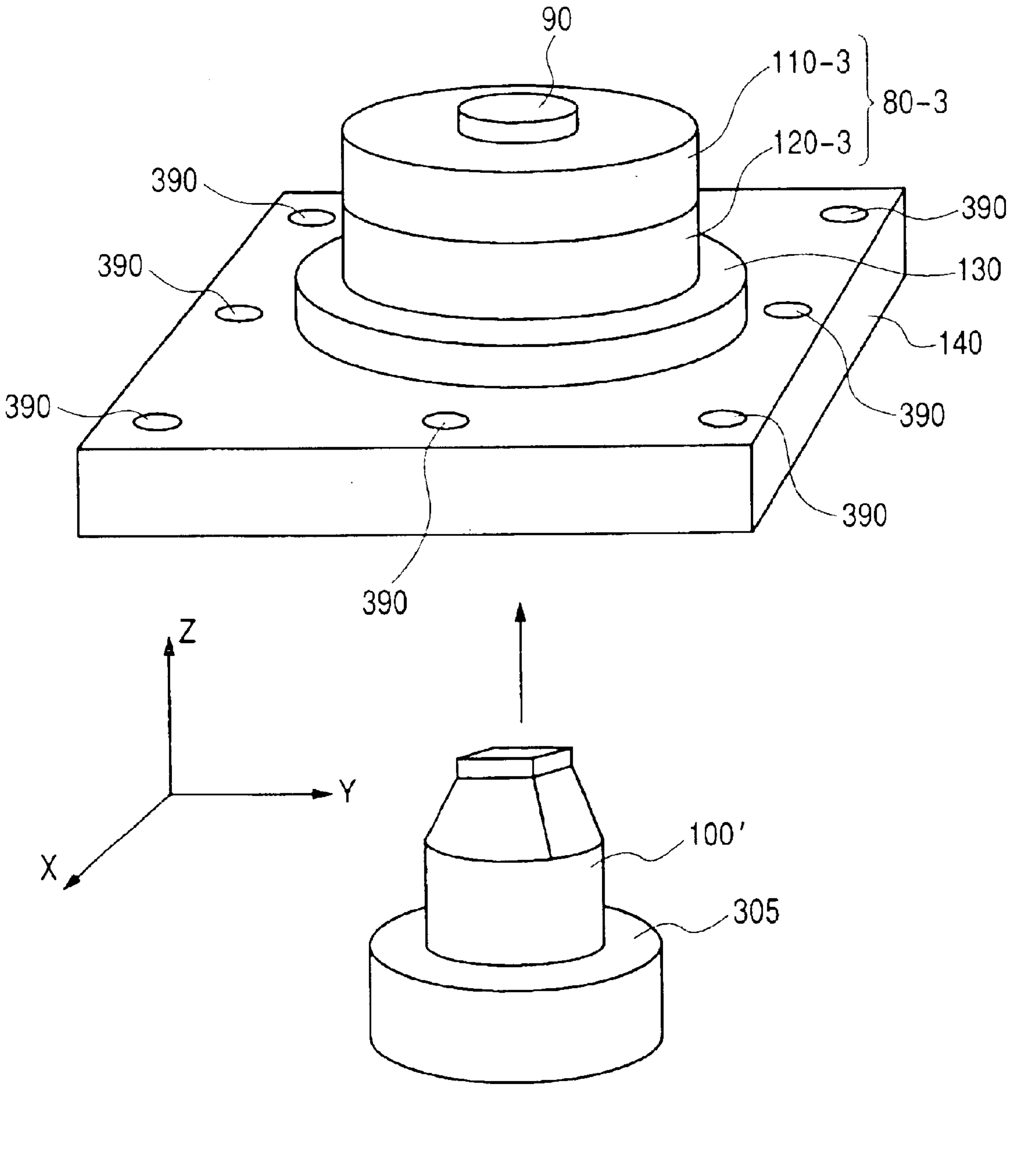
FIG. 17 is a perspective view showing a configuration of a centrifugal separator according to Embodiment 5, another mode of Embodiment 3, of the invention.

FIG. 17 is a perspective view showing a configuration of a centrifugal separator according to Embodiment 5, another mode of Embodiment 3, of the invention. The centrifugal separator shown in FIG. 17 is suitable for discrete treatment. There is a constitutional difference between the centrifugal separator according to Embodiment 3 and the centrifugal separator according to Embodiment 5. As shown in FIG. 17, the centrifugal separator comprises a centrifugal rotor 80-3 comprising a upper part 110-3 with a screw hole formed and a lower part 120-3, the bearing 130 supporting the centrifugal rotor 80-3 in the rotatable state by means of multiple abrasion-resistance rigid balls, and the centrifuge rotor supporting stand 140. The centrifugal rotor-supporting stand 140 is fixedly held on, for example, a test bench or a transport plate, through a fixing hole 390. The centrifugal rotor 80-3 is driven from the lower side for rotation.

Figure 18:
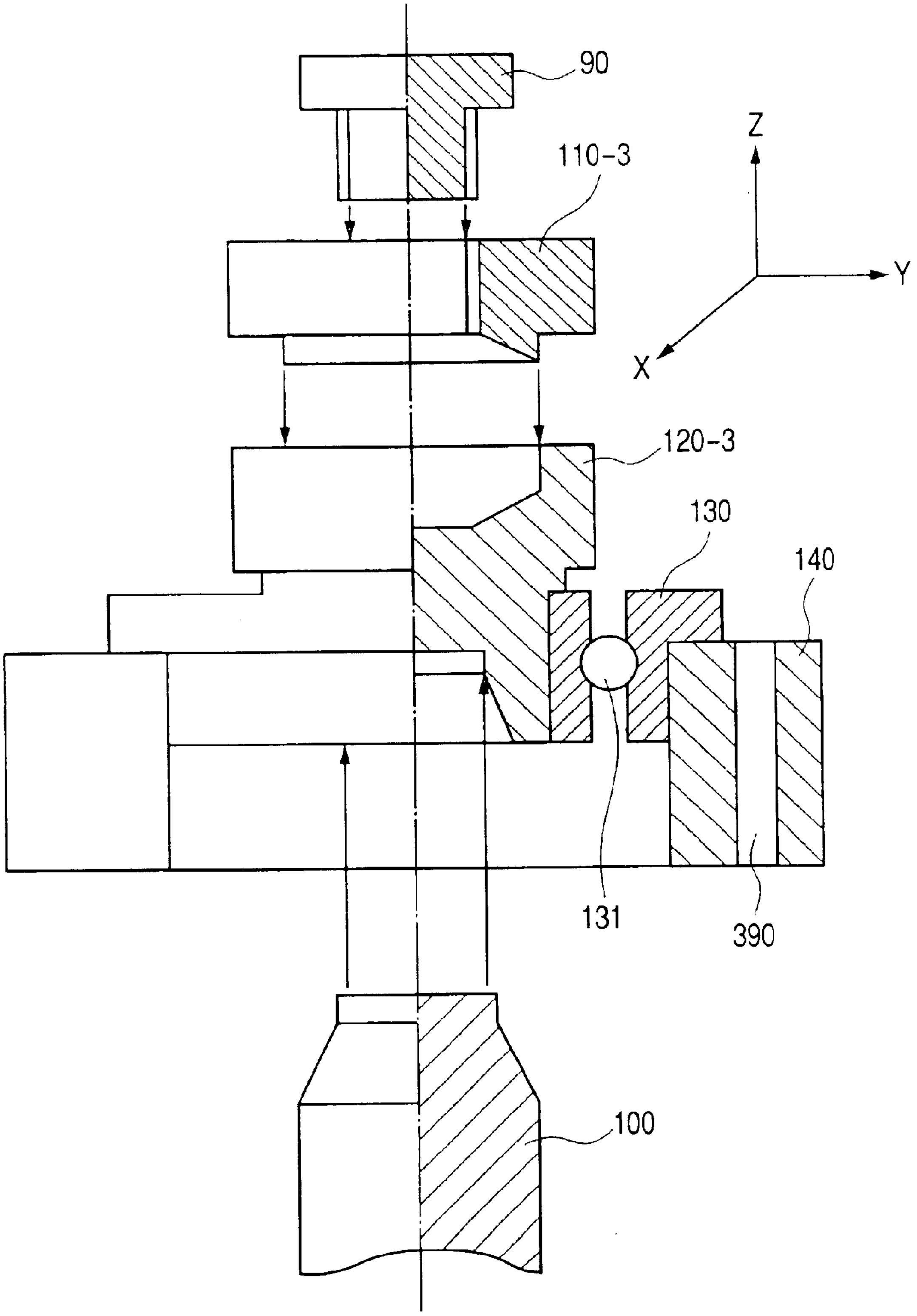
FIG. 18 is a sectional view showing the centrifugal separator according to Embodiment 5 of the invention.

FIG. 18 shows a sectional view (A—A' sectional view) in a plane including a direction (axis Y), in which the maximum length of the sample separation chamber 70 lies, including a rotation axis (the first direction, axis Z) of the centrifugal rotor 80-3. The centrifugal rotor 80-3 comprises the upper part 110-3 and the lower part 120-3. In the same way as that of another mode 1 of Embodiment 1, the screw hole is formed at the top of the upper part 110-3. The fitting of the upper part 110-3 with the lower part 120-3 defines the sample separation chamber 70 in the centrifugal rotor 80-3. The lower part 120-3 is fitted into the bearing 130. A fitting concave portion is formed on the bottom face of the lower part 120-3, with which the square pole and the frustum at the tip of the lower rotation axis 100 connected to the motor 305 are closely engaged. The fitting concave portion does not penetrate into the sample separation chamber 70. After the sample solution is injected into the sample separation chamber 70 from the screw hole of the upper part 110-3, the screw hole of the upper part 110-3 with a fitting bolt cover 90. The tip of the cover 100 is engaged with the fitting concave portion and the rotation moment of the motor 350 is transmitted to the centrifugal rotor 80-3.

According to another mode of Embodiment 5, it might be acceptable that a opening with the same shape as that of the upper opening 3 shown in Embodiment 1–Embodiment 4 is formed instead of a screw and a mechanism for locking the cover, which closes the opening, is introduced in the centrifugal rotor 80-3 to the opening is sealed in the same way as that of another mode 2 of Embodiment 1. Furthermore, according to another mode of Embodiment 5, it might be acceptable that in the same way as that of Embodiment 1, the lower rotation axis 100 directly connected to the motor 305 is directly connected to the bottom f the centrifugal rotor 80-3.

Since no structure except for the cover 90 exists at the top of the centrifugal rotor 80-3, easy access to the sample separation chamber 70 is achieved for injecting the sample solution and recovering the sample using a pipette.

In Embodiment 1–Embodiment 5 described above, the square pole and the frustum of the tip of the cover 100 also serving as the upper or lower rotation axis are closely engaged with the upper opening 3 or the fitting concave portion and the upper or rotation axis is connected to the centrifugal rotor, while it might be acceptable that the shape of the tip of the cover 100 is changed from the square pole to a polyhedral pole or a star pole and can be closely engaged with the upper opening 3 or the fitting concave portion. Alternately, it might be acceptable that the shape of the tip of the upper opening 3 or the fitting concave portion is changed to the frustum and the tip of the cover 100 is changed to the frustum and the tip of the cover 100 is closely engaged with the upper opening 3 or the fitting concave portion to transmit the rotation moment of the motor by friction (friction driving).

The centrifugal rotors (10-1, 10-2) according to Embodiment 1 and Embodiment 2 can be manufactured using the upper part and the lower part in the same way as those of Embodiment 3, Embodiment 4, and Embodiment 5. In Embodiment 3–Embodiment 5, the centrifugal rotors (80-1, 80-2, 80-3) are integral molded by fitting the upper parts s (110-1, 110-2, 110-3) with the lower parts s (120-1, 120-2, and 120-3) the fitting concave portion which is closely engaged with the square pole and the frustum of the tip of the while it might be acceptable that the centrifugal rotors (10-1, 10-2, 10-3, 80-1, 80-2, 80-3) described in Embodiment 1–Embodiment 5 might be combined into one by hot welding or adhering between the upper part s and the lower part . Furthermore, the upper part and the lower part are combined with a screw using any sealing materials such as O-rings.

To implement fast rotation of the centrifugal rotors according to Embodiment 1–Embodiment 5, it is preferable that the centrifugal rotor is made of titanium alloy but high-strength aluminum and stainless steal, which have such characteristics as hard to rust or high-strength, may be used instead.

Embodiment 6

Figure 19:
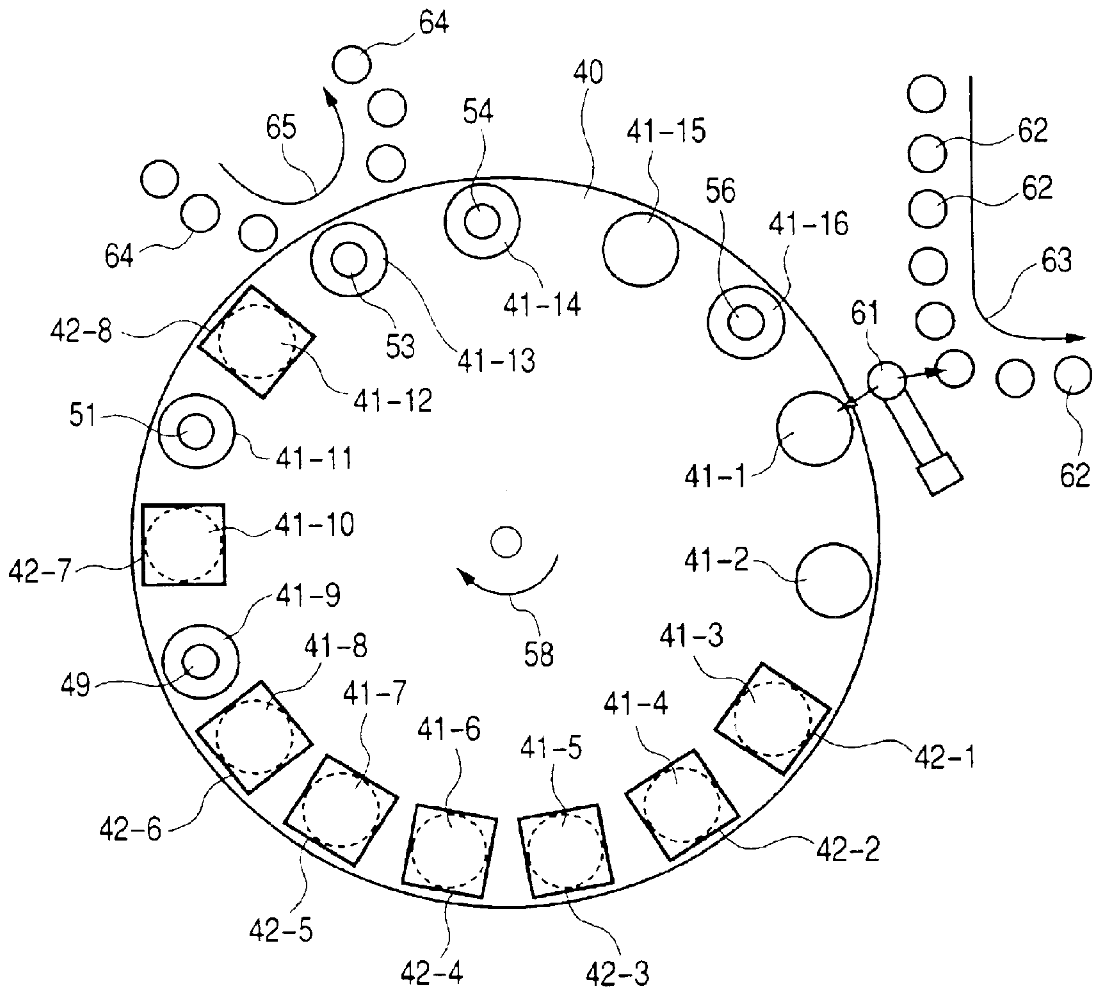
FIG. 19 is a plan view explaining Example 6, of which an example depicts the use of the multiple centrifugal rotors according to Embodiment 2 or Embodiment 4 and a sample preparation device and a sample preparation method for independently preparing the sample for each of them.

FIG. 19 is a plan view explaining examples of Embodiment 6, the former example being the sample preparation device, which has multiple centrifugal rotors according to Embodiment 2 or Embodiment 4, the rotation driving of the individual centrifugal rotors are independently controlled, and can perform discrete treatment, in which sample addition, centrifugation, sample recovery, and the like are automatically performed independently for each of centrifugal rotors, and the latter example being the sample preparation method using the sample preparation device.

In the example shown in FIG. 19, the sample preparation device comprises 16 centrifugal rotors (disposed at the rotating positions of rotating plates 40, 41-1, 41-2, -, 41-16), a transport plate 40 carrying the centrifugal rotors, a automatic pipette 61 injecting the sample solution into the centrifugal rotors, covers also serving as upper rotating members s (disposed at the positions, 42-1, 42-2, -, 42-8), a recovery vessel 64 recovering centrifuged samples from the centrifugal rotors and a transport device carrying the recovery device, a pressurizer (disposed at the position, 53, 56), a vessel 62 containing PCR-amplified products and a transport device carrying the vessel 62, a cleaning device (disposed at the position 54) and the like. The driving motors are attached to the covers also serving as the upper rotating members s (disposed at the rotating positions upstream on the transport plate, 42-1, 42-2, -, 42-8).

Note that 16 centrifugal rotors are fixed on the rotating transport plate while the covers also serving as the upper rotating members s, the automatic pipette, the pressurizer also serving as a dividing injector, the cleaning device are disposed in a space above the transport plate without getting into contact with the transport plate so that they can be freely move up and down.

In Embodiment 6, an example of a device is described, which performs sample preparation by recovering sample DNAs by ethanol sedimentation using multiple centrifugal rotors explained in Embodiment 2 or Embodiment 4. The sample used is 50 .l of solution containing double-strand DNAs obtained by PCR amplification. The hot cycle, in which the solution is maintained at 90 for 30 seconds, at 60 for 30 seconds, and at 72 for 60 seconds, is repeated 30 times. To change to any different temperature condition, it takes about 0.5./sec. Accordingly, it takes about two hours until the PCR reaction is complete but in Embodiment 6, the PCR reaction is set so that the PCR reaction is complete for each of vessels at an interval of four minutes. The PCR-amplified vessel 62 moves stepwise in the direction indicated by an arrow 63 at a rate of one-step/two minutes. The PCR-amplified liquid contains not only PCR-amplified products but also residual dNTP and primers, and a buffer used in PCR (here, Tris-HCl buffer with pH 9.5 is used). Out of the contents, dNTP and the PCR buffer can be easily removed by ethanol sedimentation. 5 .l of 3M sodium acetate (pH 5.2) and 137 .l of ethanol are added after the PCR reaction is complete.

Hereafter, the steps to be taken and the processes to be follows on the centrifugal rotors at the rotating positions, 41-1, 41-2, -, 41-16 on the transport plate are described. The sample solution is injected into the centrifugal rotor at the rotating position 41-1 on the transport plate 40 from the vessel 62 containing the PCR-amplified product using the automatic pipette 61. After the sample solution is injected, the transport plate 40 moves, while rotating, in the direction indicated by an arrow by one step and the sample is injected into the centrifugal rotor at the rotating position 41-16 n the transport plate. Since the PCR-amplified products are produced at an interval of four minutes, the sample is injected into the centrifugal rotors at a rate of one-rotor/four minutes. At the position 41-3 on the transport plate, the cover also servicing as the upper rotating member connected to the motor is put on the centrifugal rotor with the sample vessel attached at the rotating position 42-1 and the centrifugal rotor is started for centrifugation.

The transport plate 40 rotates in the direction indicated by the arrow 58 at a rate of one-step/four minutes. At the positions 42-1, 41-2, -, 42-6 (at six positions in total), the covers also serving as the upper rotating axes are put on the centrifugal rotors at the rotating positions, 41-3, 41-4, -, 41-8 on the transport plate. At the position 42-1, where the covers are put on, and at the position 42-6, where the covers are removed, the centrifugal rotors at the positions, 41-3 and 41-8 stops. Accordingly, the time period, in which the centrifugal rotors at the positions, 41-3, 41-4, -, 41-8 on the transport plate rotate and the samples are centrifuged, is 20 minutes, which is the time required for the transport 40 to rotate by five steps. The parameter has been set so that centrifugation is performed at 14000 rpm.

After centrifugation is complete, at the position 42-6, the cover also serving as the upper rotating member is removed from the centrifugal rotor at the rotating position 41-8 on the transport plate. The supernatant liquid obtained centrifugation is automatically discharged from the opening at the bottom of the centrifugal rotor at the rotating position 41-8 on the transport plate. From the centrifugal rotor at the rotating position 41-9 on the transport plate, the residual supernatant liquid is forced to discharge under air pressure by the pressurizer also serving as the automatic dividing injector (disposed at the position 49).

Subsequently, 70% of ethanol solution is injected into the centrifugal rotor at the rotating position 41-9 on the transport plate using the pressurizer also serving as the automatic dividing injector disposed at the position 49). At the position 42-7, the cover also serving as the upper rotating member is put on the centrifugal rotor at the rotating position 41-10 on the transport plate and the centrifugal rotor is started for centrifugation. After the ethanol solution is discharged from the centrifugal rotor at the rotating position 41-11 on the transport plate under air pressure by the automatic dividing injector 51 also serving as the pressurizer, 100 .l of the dissolving liquid for dissolving the precipitates is injected into the centrifugal rotor at the rotating position 41-1 on the transport plate.

At the position 42-8, the cover also serving as the upper rotating member is put on the centrifugal rotor at the rotating position 41-12 on the transport plate, the centrifugal rotor is started for centrifugation, and the DNA precipitates are dissolved. At the position 53, a pressurized air is blown from the upper opening using the pressurizer 53 and the solution containing the dissolved DNAs is recovered into the recovery vessel 64 from the lower opening. After recovery is complete, the recovery vessel 64 moves in the direction indicated by the arrow 65. The cleaning liquid is sprayed into the centrifugal rotor at the rotating position 41-14 on the transport plate from a cleaning device 54 for cleaning. The centrifugal rotor at the rotating position 41-15 on the transport plate is naturally dried and from the centrifugal rotor at the rotating position 41-16 on the transport plate, the residual cleaning liquid is discharged by an air blown from the upper opening of the centrifugal rotor under pressure applied by the pressurizer at the position 56.

Figure 20:
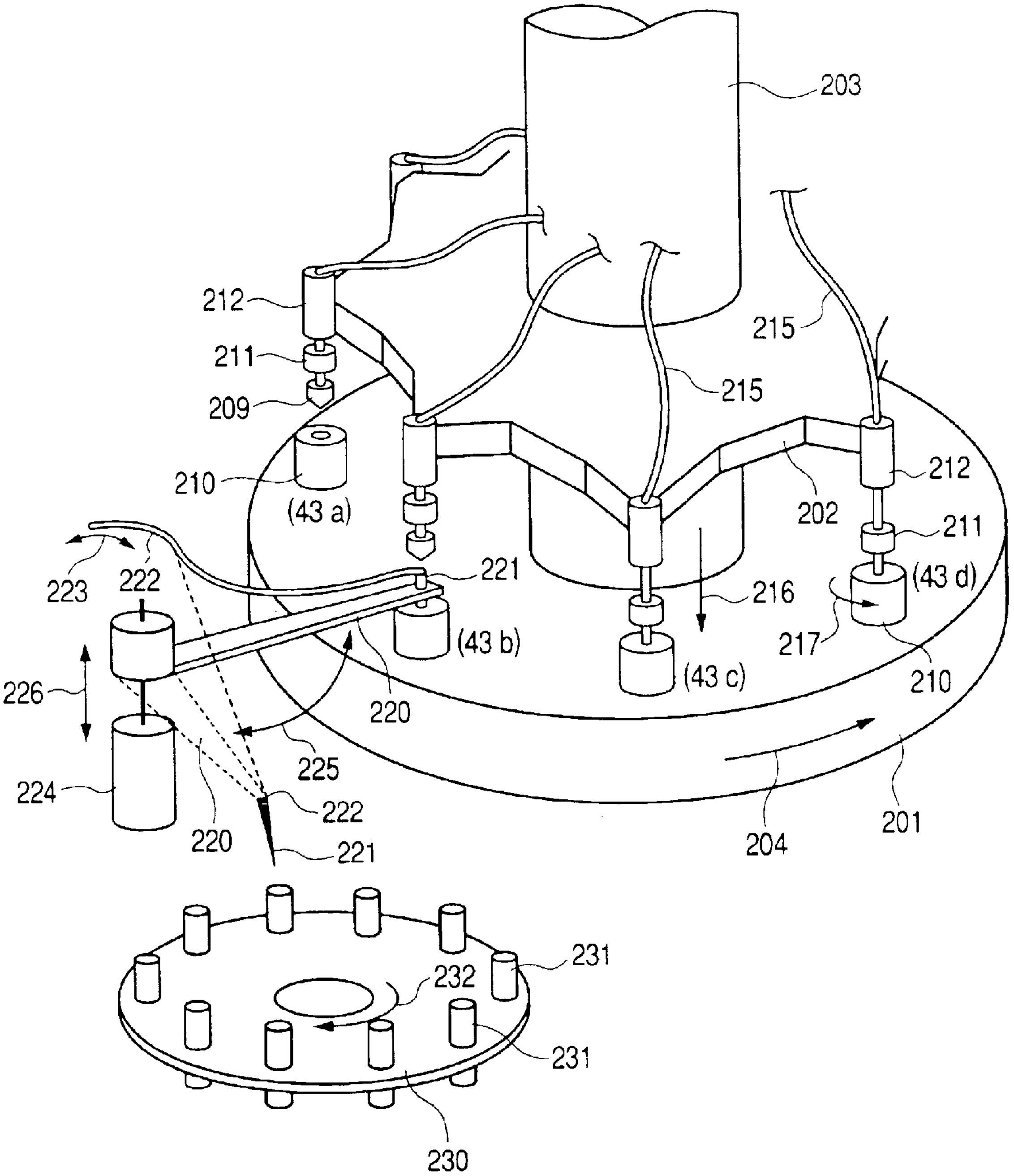
FIG. 20 is a perspective view explaining a mechanism for rotating the centrifugal rotor and a mechanism for moving a pipette nozzle in Embodiment 6 of the invention.

FIG. 20 is a perspective view explaining a mechanism for rotating the centrifugal rotors by automatically coupling a cover 209 also servicing as the upper rotating member connected to a driving motor to the top of the centrifugal rotor and a mechanism for moving a pipette nozzle, which automatically supplies the sample solution, according to Embodiment 6 of the invention. The centrifugal rotors 210 are arrayed at the positions 43*a*, 43*b*, 43*c*, 43*d* and so on the periphery of a disk-shape transport plate 201 at an almost even interval. The transport plate 201 is fixed to an axis 223 and moves stepwise in the direction indicated by an arrow 204.

The driving motor 211 is coupled to a hydraulic cylinder 212 and can move up and down in the direction indicated by an arrow 216. The hydraulic cylinder 212 is forced to reciprocate up and down by a hydraulic pressure in a hydraulic cylinder pipe 215. The hydraulic cylinder 212 is fixed to a fixing stand 202, which in turn, is connected to an axis 223, and moves stepwise in the direction indicated by the arrow 204, while rotating, in engagement with a transport plate 202.

At the position 43*a*, the cover 209 also serving as the upper rotating member has not yet coupled to the centrifugal rotor 201. In other words, from the upper opening of the centrifugal rotor 210, the sample solution can be injected and the sample can be recovered.

At the position 43*b*, the sample solution is injected into the concave portion of the solution holding vessel from the opening of the centrifugal rotor using a hydraulic pipette nozzle 221. The pipette nozzle 221 is fixed to the tip of the nozzle-supporting stand. The pipette nozzle 221 can suck and discharge the solution in the direction indicated by the arrow 223 using the hydraulic pipe 222. The pipette nozzle 221 can move between the centrifugal rotor at the position 43*b* and a sample vessel 231 in the bi-direction indicated by an arrow 225. The pipette nozzle 221 can move up and down in the direction indicated an arrow 226 by an air cylinder 224. The sample vessel 231 is held a rotating stand 230 and moves stepwise in the direction indicated by an arrow 232 in engagement with a transport plate 201. At the position 43*c*, the centrifugal rot or having the sample solution injected is coupled to the cover 209 also serving as the upper rotating member connected to the motor 211. At the position 43*d*, the centrifugal rotor is forced to rotate by the motor in the direction indicated by an arrow 271 for centrifuging the sample.

Embodiment 7

Figure 21:
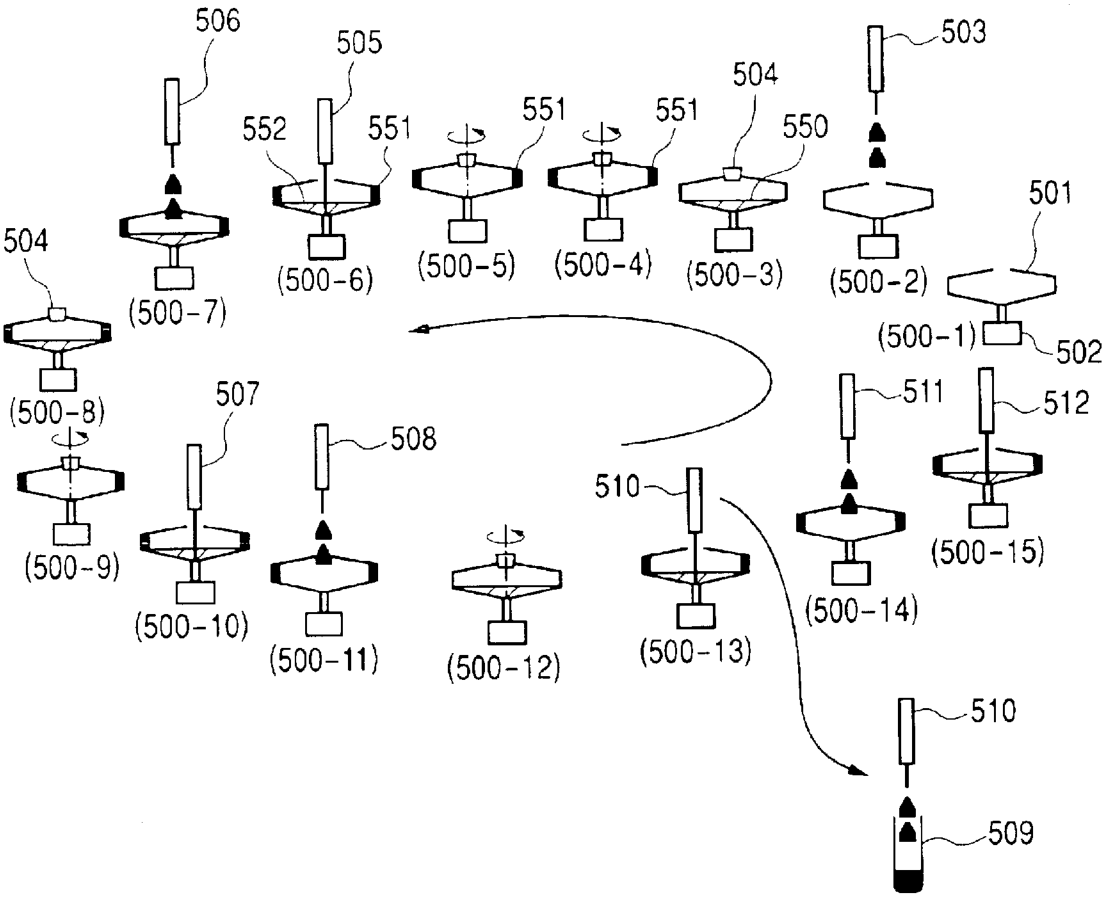
FIG. 21 is a schematic representation explaining Example 7, of which an example depicts the use of the multiple centrifugal rotors according to any of other modes 1 and 2 of Embodiment 1, Embodiment 5, and another mode of Embodiment 5, and a sample preparation device and sample separation method for independently preparing the sample for each of them.

FIG. 21 is a schematic representation explaining the examples according to Embodiment 7 of the invention, the former example being the sample preparation device, which has multiple centrifugal rotors according to any of another mode 1 or 2 of Embodiment 1, Embodiment 5, and the another mode of Embodiment 5, in which rotation driving of the centrifugal rotors are individually controlled, and which can perform discrete treatment, that is, sample addition, centrifugation, sample recovery and the like can be performed for each centrifugal rotor, and the procedure for sample preparation using the sample preparation device. For easy recognition, in FIG. 21, the complicated shape of the centrifugal rotor is represented by a simplified cross section. The sample used in Embodiment 7 is M13 phage DNAB obtained by incubation.

In Embodiment 7, centrifugal rotors 501 are fixed at the positions, 500-1–500-15 on the periphery of the disc-shape transport plate not indicated in FIG. 21 at an almost even interval. The centrifugal rotors as shown by an arrow at the center of FIG. 21, the centrifugal rotors move stepwise, while rotating, in the counterclockwise direction. Each of the sample preparation processes is circulated by repeating the rotation. A driving motor 502 is coupling to the bottom of a centrifugal rotor. In other words, the lower rotation axis directly connected to the driving motor is directly connected to the bottom of the centrifugal rotor 501.

At the position 500-1, the centrifugal rotor is in the waiting state. At the position 500-2, the sample solution is sucked from the sample solution vessel not indicated in FIG. 21 and injected into the centrifugal rotor by an automatic pipette 503. The centrifugal rotor with the sample solution injected moves, while rotating, to the position 500-3 and a cover 504 is put on the upper opening. The centrifugal rotor with its cover attached moves, while rotating, to the position 500-4 and the centrifugal rotor begins to rotate for centrifugation. At the position 500-5, centrifugation continues. The centrifugal rotor moves, while rotating, to the position 500-6 and is stopped to cease centrifugation. Subsequently, the cover is removed from the centrifugal rotor and the supernatant liquid obtained by centrifugation is sucked out from the centrifugal rotor using a suction apparatus 505. In the centrifugal rotor, precipitates 551 are left.

The centrifugal rotor moves, while rotating, to the position 500-7 and a cleaning liquid (70% of alcohol solution) is injected into it by the automatic pipette 506. The centrifugal rotor moves, while rotating, to the position 500-8 and the cover is put on it. The centrifugal rotor moves, while rotting, to the position 500-9 and starts to rotate. After stopping rotation, the centrifugal rotor moves, while rotating, to the position 500-10 the cleaning liquid is sucked out from it by a suction apparatus 507. At that point, precipitates 551 have been yet deposited on the inner wall of the centrifugal rotor. The centrifugal rotor moves, while rotating, to the position 500-11 100 .1 of sterile water is injected into it by an automatic pipette 508. The centrifugal rotor moves, while rotating, to the position 500-12 and starts to rotation for dissolving the precipitates 551 into the sterile water. The centrifugal rotor moves, while rotating, to the position 500-13 and the precipitated DNAs are sucked out from it into a recovery vessel 509 by an automatic pipette 510. The centrifugal rotor moves, while rotating, to the position 500-4 and the cleaning liquid is injected in it by an automatic pipette 511. The centrifugal rotor moves, while rotating, to the position 500-15 and the cleaning liquid is sucked out from it by an automatic pipette 512. The centrifugal rotor returns, while rotating, to the position 500-15 and enters in the waiting state for another sample preparation.

Note that the cover 504 of the centrifugal rotor is automatically opened or closed by a mechanism not indicated in FIG. 21 for automatically tightening or releasing the screw of the cover 504 or by a mechanism not indicated in FIG. 21 for automatically setting or releasing the lock of the cover 504.

As known from the descriptions above, in Embodiment 7, a loop is formed, in which the procedure is applied to different sample solutions involving a process for injecting the sample solution into the centrifugal rotor, a process for centrifuging the sample by rotating the centrifugal rotor, a process for dissolving the precipitated sample obtained by centrifugation, a process for recovering the dissolved sample from the centrifugal rotor, and a process for cleaning the centrifugal rotor.

According to the invention, miniature, light-type centrifugal rotors can be implemented. In the invention, multiple centrifugal rotors are mounted on a movable transport device, can move between the sample addition device and the sample recovery device, sample addition, centrifugation, and recovery can be easily performed independently for each centrifugal rotor, and the centrifugal separation suitable for automation may be provided. Furthermore, the sample preparation device capable of successively processing a given number of samples for a certain time period, which can sequentially perform the steps for sample preparation for each centrifugal rotor automatically, comprising a device used for various reactions such as PCR, a sample addition device for injecting the samples into the centrifugal rotors, a sample recovery device for recovering the centrifuged samples from the centrifugal rotors, and a cleaning device for cleaning the centrifugal rotors. In the invention, since a miniature, light-type centrifugal rotors are used, the dimension of the sample preparation device can be reduced as a whole.

A typical configuration of the invention comprises:

(C1) $A^-$ centrifugal separator consisting of centrifugal rotors with symmetric axes for two rotations having single sample separation chambers in them, which centrifuge the samples contained in the sample solutions, upper openings passing through to said sample separation chambers at their tops; members s capable of being coupling to said openings; and a rotation driving means for rotating said centrifugal rotors by rotating said members s around a rotation axis in the first direction assuming that said first direction is the direction of said symmetric axes, and having the length of said sample separation chamber in the third direction longer than the length of said sample separation chamber in the second direction assuming that two directions intersecting with said first direction are the second direction and the third direction, respectively, (C2) The centrifugal separator as described in (C1) comprising;

said member and said upper opening being closely engaged with one another to seal said upper opening by said member, (C3) The centrifugal separator as described in (C1) comprising;

samples being injected into said sample separation chamber from said upper opening, (C4) The centrifugal separator as described in (C1) comprising;

said sample separation chamber having a concave portion with its center intersecting with said symmetric rotation axis, (C5) The centrifugal separator as described in (C1) comprising;

a portion, to which the largest centrifugal acceleration generated by rotation of said centrifugal rotor is applied, having a smallest area, (C6) The centrifugal separator as described in (C1) comprising;

a lower opening, passing through to said sample separation chamber, being formed in the lower part of said centrifugal rotor, (C7) The centrifugal separator as described in (C1) comprising;

said centrifugal rotor consisting of the upper part and the lower part, both of them being fitted one another, and (C8) A centrifugal separator consisting of centrifugal rotors with symmetric axes for two rotations having single sample separation chambers in them, which centrifuge the samples contained in the sample solutions, upper openings passing through to said sample separation chambers at their tops; members s capable of being coupling to said openings; and a rotation driving means for rotating said centrifugal rotors by rotating said members s around axis Z assuming that said axis Z is said symmetric axis, and having a sectional area at the distance far from said axis Z being smaller than a sectional area at the distance near to axis Z with respect to said sectional area of said sample separation chamber in a plane parallel to the ZX plane assuming that the direction, in which the distance between the ends of said sample separation chamber is largest in the direction normal to said axis Z, is axis X and the direction intersecting with said axis Z and said axis Y is axis X, respectively, (C9) The centrifugal separator as described in (C8) comprising;

said member and said upper opening being closely engaged with one another to seal said upper opening by said member, (C10) The centrifugal separator as described in (C8) comprising;

samples being injected into said sample separation chamber from said upper opening, (C11) The centrifugal separator as described in (C8) comprising;

said sample separation chamber having a concave portion with its two planes intersecting with said symmetric rotation axis, (C12) The centrifugal separator as described in (C8) comprising;

a portion, to which the largest centrifugal acceleration generated by rotation of said centrifugal rotor is applied, having a smallest area, (C13) The centrifugal separator as described in (C8) comprising;

a lower opening, passing through to said sample separation chamber, being formed in the lower part of said centrifugal rotor, (C14) The centrifugal separator as described in (C8) comprising;

said centrifugal rotor consisting of the upper part and the lower part, both of them being fitted one another, and (C15) A centrifugal separator consisting of centrifugal rotors with symmetric axes for two rotations having single sample separation chambers in them, which centrifuge the samples contained in the sample solutions, upper openings passing through to said sample separation chambers at their tops; and a rotation driving means for rotating said centrifugal rotors by rotating said members s around rotation axes assuming that said symmetric rotation axes are said rotation axis; and the solution holding vessel having a concave portion fixed in said sample separation chamber for holding said sample solution, (C16) The centrifugal separator as described in (C15) comprising;

said centrifugal rotor consisting of an upper part and a lower part, both of said upper part and said lower part being fitted one another, (C17) A centrifugal separator consisting of centrifugal rotors with symmetric axes for two rotations having single sample separation chambers in them, which centrifuge the samples contained in the sample solutions, upper openings passing through to said sample separation chambers at their tops and lower openings passing through to said sample separation chamber in the lower parts; a rotation driving means for rotating said centrifugal rotors by rotating said members s around axis Z assuming that said symmetric rotation axis is axis Z; and the solution holding vessel having a concave portion fixed in said sample separation chamber for holding, said sample solution injected from said upper opening, wherein provided that the direction, in which the distance between the ends of said sample separation chamber is the largest in the direction normal to said axis Z, is axis Y, the longitudinal direction of said solution holding vessel corresponds to said axis Y.

(C18) The centrifugal separator as described in (C17) comprising;

said centrifugal rotor consisting of the upper part and the lower part , both of the upper part and the lower part being fitted one another (C19) A centrifugal separator consisting of centrifugal rotors with symmetric axes for two rotations having single sample separation chambers in them, which centrifuge the samples contained in the sample solutions, upper openings passing through to said sample separation chambers at their tops and lower openings passing through to said sample separation chamber in the lower parts; members capable of being coupled to said openings; and a rotation driving means for rotating said centrifugal rotors by rotating said members s around the rotation axis in the first direction assuming that the direction of said symmetric rotation axis is the first direction; and the solution holding vessel having a concave portion fixed in said sample separation chamber for holding said sample solution injected from said upper opening, wherein provided two directions intersecting with said first direction are the second direction and the third direction, the length of said sample separation chamber in the third direction is larger than the length of said sample separation chamber in the second direction.

(C20) The centrifugal separator as described in (C19) comprising;

said member and said upper opening being closely engaged with one another to seal said upper opening by said member, (C21) The centrifugal separator as described in (C19) comprising;

said sample separation chamber having a concave portion with two planes intersecting one another including said symmetry rotation axis, (C22) The centrifugal separator as described in (C19) comprising;

a portion, to which the largest centrifugal acceleration generated by rotation of said centrifugal rotor is applied, having a smallest area, (C23) The centrifugal separator as described in (C19) comprising;

a means being provided for supporting rotatably said centrifugal rotor from the lower side, (C24) The centrifugal separator as described in (C19) comprising;

said centrifugal rotor consisting of the upper part and the lower part, both of the upper part and the lower part being fitted one another.

(C25) A centrifugal separator consisting of centrifugal rotors with symmetric axes for two rotations having single sample separation chambers in them, which centrifuge the samples contained in the sample solutions, upper openings passing through to said sample separation chambers at their tops and lower openings passing through to said sample separation chamber in the lower parts; members capable of being coupled to said openings; and a rotation driving means for rotating said centrifugal rotors by rotating said members s around axis Z assuming that said symmetric rotation axis is axis Z; and the solution holding vessel having a concave portion fixed in said sample separation chamber for holding said sample solution injected from said upper opening, and having the cross sectional area at the distance far from said axis Z smaller than the cross sectional area at the distance near said axis Z with respect to the cross sectional areas of said sample separation chamber in the plane normal to the ZX plane assuming that the direction, in which the distance between the ends of said sample separation chamber is largest in the direction normal to said axis Z, is axis Y and the direction intersecting with said axis Z and said axis Y is axis X, respectively, (C26) The centrifugal separator as described in (C25) comprising;

said member and said upper opening being closely engaged with one another to seal said upper opening by said member, (C27) The centrifugal separator as described in (C25) comprising;

said sample separation chamber having a concave portion with two planes intersecting one another including said symmetry rotation axis, (C28) The centrifugal separator as described in (C25) comprising;

a portion, to which the largest centrifugal acceleration generated by rotation of said centrifugal rotor is applied, having a smallest area, (C29) The centrifugal separator as described in (C25) comprising;

a means being provided for supporting rotatably said centrifugal rotor from the lower side, (C30) The centrifugal separator as described in (C25) comprising;

said centrifugal rotor consisting of the upper part and the lower part, both of the upper part and the lower part being fitted one another, (C31) A sample preparation device comprising; multiple centrifugal rotors, with symmetric rotation axes, having single sample separation chambers in them for centrifuging samples contained in sample solutions and upper openings passing through to said sample separation chambers in the upper parts; multiple rotation driving means for driving said centrifugal rotors around said rotation axes assuming that said symmetric rotation axes of said centrifugal rotors are rotation axes; and a control means for driving said rotation driving means independently, (C32) The sample preparation device as described in (C31) comprising;

said control means controlling both of injection of said sample solutions into said sample separation chambers of said centrifugal rotors and recovery of said samples from said sample separation chambers of said centrifugal rotors for each of the centrifugal rotors, (C33) The sample preparation device as described in (C31) comprising;

said centrifugal rotors being disposed at a transport device moving on a loop-shape trajectory, (C34) The sample preparation device as described in (C31) comprising;

said centrifugal rotors being disposed at the transport device moving on the loop-shape trajectory and at a given interval, where said transport device moves, said centrifugal rotors being rotated for centrifuging said sample solutions, (C35) The sample preparation device as described in (C31) comprising;

said centrifugal rotors being disposed at said transport device moving on a circular trajectory, (C36) The sample preparation device as described in (C31) comprising;

said centrifugal rotors being disposed at the transport device moving on the circular trajectory, and at the given interval, where said transport device moves, said centrifugal rotors being rotated for centrifuging said sample solutions, (C37) A sample preparation device comprising;

multiple centrifugal rotors, with symmetric rotation axes, having single sample separation chambers in them for centrifuging samples contained in sample solutions, upper openings passing through to said sample separation chambers in the upper parts and lower openings passing through to said sample separation chamber in the lower parts; the solution holding vessel having a concave portion for holding said sample solutions injected from said upper openings; multiple rotation driving means for driving said centrifugal rotors around said rotation axes assuming that said symmetric rotation axes of said centrifugal rotors are rotation axes; and a control means for driving said rotation driving means independently, (C38) The sample preparation device as described in (C37) comprising;

said control means controlling both of injection of said sample solutions into said solution holding vessel and recovery of the said samples from said sample separation chamber of said centrifugal rotors for each of said centrifugal rotors, (C39) The sample preparation device as described in (C37) comprising;

said centrifugal rotors being disposed at the transport device moving on the loop-shape trajectory, (C40) The sample preparation device as described in (C37) comprising;

said centrifugal rotors being disposed at the transport device moving on the loop-shape trajectory and at a given interval, where said transport device moves, said centrifugal rotors being rotated for centrifuging said sample solutions, (C41) The sample preparation device as described in (C37) comprising;

said centrifugal rotors being disposed at the transport device moving on the circular trajectory, (C42) The sample preparation device as described in (C37) comprising;

said centrifugal rotors being at the transport device moving on the circular trajectory and at a given interval, where said transport device moves, said centrifugal rotors being rotated for centrifuging said sample solutions, (C43) A sample preparation method using multiple centrifugal rotors, with symmetric rotation axes for two rotations, having single sample separation chambers in them for centrifuging the samples contained in the sample solutions and the upper openings passing through to said sample separation chambers comprising;

(1) a process for injecting said sample solutions into said sample separation chambers of said centrifugal rotors, (2) a process for moving said centrifugal rotors on the loop-shape trajectory, (3) a process for centrifuging said sample solutions, assuming that said symmetric rotation axes are the rotation axes, by rotating said centrifugal rotors around said rotation axes, and (4) a process for recovering said samples obtained by centrifugation from said sample separation chambers of said centrifugal rotors, (C44) A sample preparation method using multiple centrifugal rotors, with symmetric rotation axes for two rotations, having single sample separation chambers in them for centrifuging the samples contained in the sample solutions and the upper openings passing through to said sample separation chambers comprising;

(1) a process for injecting said sample solutions into said sample separation chambers of said centrifugal rotors, (2) a process for moving said centrifugal rotors on the loop-shape trajectory, (3) a process for centrifuging said sample solutions to produce said sample precipitates, assuming that said symmetric rotation axes are the rotation axes, by rotating said centrifugal rotors around said rotation axes, (4) a process for discharging the supernatant liquid obtained by centrifugation from said sample separation chamber, (5) a process for cleaning away said residual precipitates deposited in said sample separation chambers of said centrifugal rotors, (6) a process for injecting solvents into said sample separation chambers of said centrifugal rotors, rotating independently said centrifugal rotors, and dissolving said precipitates into said solvent, and (7) a process for recovering said the solvent containing said dissolved precipitates from said sample separation chambers of said centrifugal rotors into the recovery vessel, (C45) A sample preparation method using multiple centrifugal rotors, with symmetric rotation axes for two rotations, having single sample separation chambers in them for centrifuging the samples contained in the sample solutions, the upper openings passing through to said sample separation chambers in the upper parts, and lower openings passing through to said sample separation chambers in the lower parts, comprising;

(1) a process for injecting said sample solutions into said sample separation chambers of said centrifugal rotors, (2) a process for moving said centrifugal rotors on the loop-shape trajectory, (3) a process for centrifuging said sample solutions, assuming that said symmetric rotation axes are the rotation axes, by rotating said centrifugal rotors around said rotation axes, (4) a process for recovering said samples obtained by centrifugation from said sample separation chambers of said centrifugal rotors, (C46) A sample preparation method using multiple centrifugal rotors, with symmetric rotation axes for two rotations, having single sample separation chambers in them for centrifuging the samples contained in the sample solutions and the upper openings passing through to said sample separation chambers comprising;

(1) a process for injecting said sample solutions into solution holding vessels having concave portions disposed at said sample separation chambers of said centrifugal rotors, (2) a process for moving said centrifugal rotors on the loop-shape trajectory, (3) a process for centrifuging said sample solutions to produce said sample precipitates, assuming that said symmetric rotation axes are the rotation axes, by rotating said centrifugal rotors around said rotation axes, (4) a process for discharging the supernatant liquid obtained by centrifugation from said lower openings of said sample separation chamber, (5) a process for cleaning away said residual precipitates deposited in said sample separation chambers of said centrifugal rotors, (6) a process for injecting solvents into said solution holding vessels disposed at said sample separation chambers of said centrifugal rotors, rotating independently said centrifugal rotors, and dissolving said precipitates into said solvent, and (7) a process for recovering said the solvent containing said dissolved precipitates from said lower openings of said sample separation chambers of said centrifugal rotors into the recovery vessel, (C47) Centrifugal rotors, with symmetric rotation axes for two rotations, having single sample separation chambers in them for centrifuging the samples contained in the sample solutions, the upper openings passing through to said sample separation chambers in the upper parts, and assuming that the direction of said symmetric rotation axis is the first direction, two directions intersecting with said first direction are the second and third directions, having the length of said sample preparation chamber in said first direction longer than the length of said sample preparation chamber in said second direction, (C48) Centrifugal rotors, with symmetric rotation axes for two rotations, having single sample separation chambers in them for centrifuging the samples contained in the sample solutions, the upper openings passing through to said sample separation chambers in the upper parts, and assuming that the direction of said symmetric rotation axis is axis Z, the direction, in which the distance between the ends of said sample separation chamber in the direction normal to axis Z is the largest, is axis Y, and the direction intersecting with said axis Z and said axis Y is axis X, respectively, with respect to the cross sectional areas, said cross sectional area at the distance far form axis Z being smaller than said cross sectional area at the distance near axis Z, (C49) Centrifugal rotors, with symmetric rotation axes for two rotations, having single sample separation chambers in them for centrifuging the samples contained in the sample solutions, the upper openings passing through to said sample separation chambers in the upper parts and the lower openings passing through to said sample separation chambers in the lower parts, and the solution holding vessels, fixed in said sample separation chambers, having concave portions for holding said sample solutions injected from said upper openings, (C50) Centrifugal rotors, with symmetric rotation axes for two rotations, having single sample separation chambers in them for centrifuging the samples contained in the sample solutions, the upper openings passing through to said sample separation chambers in the upper parts and the lower openings passing through to said sample separation chambers in the lower parts, and the solution holding vessels, fixed in said sample separation chambers, having concave portions for holding said sample solutions injected from said upper openings, and assuming that the direction, in which the distance between the ends of said sample separation chamber in the direction normal to axis Z is the largest, is axis Y, and the direction intersecting with said axis Z and said axis Y is axis X, respectively, with respect to the cross sectional areas, the longitudinal direction of said sample separation vessel corresponding to said axis Y, (C51) Centrifugal rotors, with symmetric rotation axes for two rotations, having single sample separation chambers in them for centrifuging the samples contained in the sample solutions, the upper openings passing through to said sample separation chambers in the upper parts and the lower openings passing through to said sample separation chambers in the lower parts, and the solution holding vessels, fixed in said sample separation chambers, having concave portions for holding said sample solutions injected from said upper openings, and assuming that two directions intersecting with said first direction are the second and third directions, and having the length of said sample preparation chamber in said third direction longer than the length of said sample preparation chamber in said second direction, and (C52) Centrifugal rotors, with symmetric rotation axes for two rotations, having single sample separation chambers in them for centrifuging the samples contained in the sample solutions, the upper openings passing through to said sample separation chambers in the upper parts and the lower openings passing through to said sample separation chambers in the lower parts, and the solution holding vessels, fixed in said sample separation chambers, having concave portions for holding said sample solutions injected from said upper openings, and assuming that the direction, in which the distance between the ends of said sample separation chamber in the direction normal to axis Z is the largest, is axis Y, and the direction intersecting with said axis Z and said axis Y is axis X, respectively, with respect to the cross sectional areas in the plane parallel to the ZX plane, said cross sectional area at the distance far from axis Z being smaller than said cross sectional area at the distance near axis Z.

What is claimed is:

1. A sample preparation device comprising:

a plurality of centrifugal rotors for centrifuging a sample contained in a sample solution, each having a respective symmetric rotation axis, a single sample separation chamber disposed therein, and an upper opening communicating with said sample separation chamber, said respective rotation symmetric axis being included inside said sample separation chamber;

a plurality of rotation driving means each for rotating a respective one of said centrifugal rotors around said respective symmetric rotation axis; and control means for independently driving said rotation driving means of said respective rotor.

2. A sample preparation device according to claim 1, wherein said control means controls both injection of said sample solution into said sample separation chamber of each of said centrifugal rotors, and recovery of said sample from each of said sample separation chamber of each of said centrifugal rotors.

3. A centrifugal preparation device according to claim 1, wherein each of said centrifugal rotors is disposed on a transport device moving along a loop trajectory.

4. A sample preparation device according to claim 1, wherein each of said centrifugal rotors is disposed on a transport device moving along a loop trajectory, and each of said centrifugal rotors is rotated for a given time interval to carry out centrifugal separation of said sample solution contained therein.

5. A sample preparation device according to claim 1, wherein each of said centrifugal rotors is disposed on a transport device moving along a circular trajectory.

6. A sample preparation device according to claim 1, wherein each of said centrifugal rotors is disposed on a transport device moving along a circular trajectory, and each of said centrifugal rotors is rotated for a given time interval to carry out centrifugal separation of said sample solution contained therein.

7. A sample preparation device comprising:

a plurality of centrifugal rotors for centrifuging a sample contained in a sample solution, each having a respective symmetric rotation axis, a single sample separation chamber disposed therein, and an upper opening communicating with said sample separation chamber at an upper part of each rotor, and a lower opening communicating with said sample separation chamber at a lower part of each rotor, said respective rotation symmetric axis being included inside said sample separation chamber;

a plurality of solution vessels each being fixed wherein said sample separation chamber and having a concave portion for holding said sample solution injected into said sample separation chamber via said upper opening;

a plurality of rotation driving means each for rotating a respective one of said centrifugal rotors around said respective symmetric rotation axis; and control means for driving said rotation driving means, such that said rotors are driven independently from each other.

8. A sample preparation device according to claim 7, wherein said control means control both injection of said sample solution into said sample separation chamber of each of said centrifugal rotors, and recovery of said sample from each of said sample separation chamber of each of said centrifugal rotors.

9. A centrifugal preparation device according to claim 7, wherein each of said centrifugal rotors is disposed on a transport device moving along a loop trajectory.

10. A sample preparation device according to claim 7, wherein each of said centrifugal rotors is disposed on a transport device moving along a loop trajectory, and each of said centrifugal rotors is rotated for a given time interval to carry out centrifugal separation of said sample solution contained therein.

11. A sample preparation device according to claim 7, each of said centrifugal rotors is disposed on a transport device moving along a circular trajectory.

12. A sample preparation device according to claim 7, wherein each of said centrifugal rotors is disposed on a transport device moving along a circular trajectory, and each of said centrifugal rotors is rotated for a given time interval to carry out centrifugal separation of said sample solution contained therein.

13. A method for preparing at least one sample with a plurality of centrifugal rotors each having a single sample separation chamber therein for centrifuging a sample contained in a sample solution, an upper opening communicating with said sample separation chamber, each of said rotors having a respective symmetric rotation axis included inside said sample separation chamber, said method comprising:

injecting said sample solution into said sample separation chamber of each of said centrifugal rotors;

moving each of said centrifugal rotors along a loop-shape trajectory;

centrifuging said sample solution by rotating said centrifugal rotors independently around said respective symmetric rotation axis; and recovering said sample obtained by centrifugation from each of said sample separation chambers of said centrifugal rotors.

14. A method for preparing at least one sample with a plurality of centrifugal rotors each having a single sample separation chamber therein for centrifuging a sample contained in a sample solution, an upper opening communicating with said sample separation chamber, each of said rotors having a respective symmetric rotation axis included inside said sample separation chamber, said method comprising:

injecting said sample solution into said sample separation chamber of each of said centrifugal rotors;

moving each of said centrifugal rotors along a loop-shape trajectory;

centrifuging said sample solution to produce a precipitate of said sample by independently rotating each of said centrifugal rotors around said respective symmetric rotation axis;

discharging a supernatant liquid obtained by centrifugation of said sample solution in said sample separation chamber of each of said centrifugal rotors;

cleaning away said precipitate deposited in said sample separation chamber of each of said centrifugal rotors;

injecting a solvent into at least one of said sample separation chambers of said centrifugal rotors thereby dissolving said precipitate in said solvent; and recovering precipitate dissolved in said solvent from each of said sample separation chambers of said centrifugal rotors into at least one recovery vessel.

15. A method for preparing at least one sample with a plurality of centrifugal rotors each having a single sample separation chamber therein for centrifuging a sample contained in a sample solution, an upper opening communicating with said sample separation chamber at an upper part of a respective centrifugal rotor, and a lower opening communicating with said sample separation chamber at a lower part of a respective centrifugal rotor, each of said rotors having a respective symmetric rotation axis included inside said sample separation chamber, said method comprising:

injecting said sample solution into at least one of solution holding vessels fixed in said sample separation chamber each having a concave portion in said sample separation chamber;

moving each of said centrifugal rotors along a loop-shape trajectory;

centrifuging said sample solution by rotating each of said centrifugal rotors independently around said respective rotation symmetric axis; and recovering said sample obtained by centrifugation from each of said sample separation chambers of said centrifugal rotors.

16. A method for preparing at least one sample with a plurality of centrifugal rotors each having a single sample separation chamber therein for centrifuging a sample contained in a sample solution, an upper opening communicating with said sample separation chamber at a lower part of a respective centrifugal rotor, each of said rotors having a respective symmetric rotation axis included inside said sample separation chamber, said method comprising:

injecting said sample solution into at least one of solution holding vessels fixed in said sample separation chamber each having a concave portion in said sample separation chamber;

moving each of said centrifugal rotors along a loop-shape trajectory;

centrifuging said sample solution to produce a precipitate of said sample by independently rotating each of said centrifugal rotors around said respective symmetric rotation axis;

discharging a supernatant liquid obtained by centrifugation of said sample solution in said sample separation chamber of each of said centrifugal rotors;

cleaning away said precipitate deposited in said sample separation chamber of each of said centrifugal rotors;

injecting a solvent into at least one of said sample separation chambers of said centrifugal rotors thereby dissolving said precipitate in said solvent; and recovering precipitate dissolved in said solvent from each of said sample separation chambers of said centrifugal rotors into at least one recovery vessel.

* * * * *